United States Patent
Saeed

(10) Patent No.: US 10,781,591 B2
(45) Date of Patent: Sep. 22, 2020

(54) WIND PROTECTION DEVICE FOR A BUILDING

(71) Applicant: Elemental Engineering AG, Baar (CH)

(72) Inventor: Osman Saeed, Stans (CH)

(73) Assignee: Elemental Engineering AG, Baar (CH)

( * ) Notice: Subject to any disclaimer, the term of this patent is extended or adjusted under 35 U.S.C. 154(b) by 0 days.

(21) Appl. No.: 16/604,829

(22) PCT Filed: Apr. 12, 2018

(86) PCT No.: PCT/EP2018/059482
§ 371 (c)(1),
(2) Date: Oct. 11, 2019

(87) PCT Pub. No.: WO2018/189348
PCT Pub. Date: Oct. 18, 2018

(65) Prior Publication Data
US 2020/0095765 A1    Mar. 26, 2020

(30) Foreign Application Priority Data
Apr. 13, 2017 (EP) ..................... 17166550

(51) Int. Cl.
*E04B 1/92* (2006.01)
*E04C 1/39* (2006.01)
(Continued)

(52) U.S. Cl.
CPC ............... *E04C 1/392* (2013.01); *E04B 1/92* (2013.01); *E04H 9/14* (2013.01); *F03D 9/43* (2016.05);
(Continued)

(58) Field of Classification Search
CPC .... E04C 1/392; E04B 1/92; F03D 9/43; F24F 11/30
See application file for complete search history.

(56) References Cited

U.S. PATENT DOCUMENTS 4,143,703 A * 3/1979 Creswick .................. F24D 3/14
                                                             165/48.1
4,286,420 A * 9/1981 Pharmakidis ............. E04B 1/74
                                                              52/404.1
(Continued)

FOREIGN PATENT DOCUMENTS

CN      203499507 U    3/2014
DE      297 05 912 U1  5/1997
(Continued)

OTHER PUBLICATIONS

Written Opinion for PCT/EP2018/059482, dated Jun. 25, 2018.
International Search Report for PCT/EP2018/059482, dated Jun. 25, 2018.

*Primary Examiner* — Paola Agudelo
(74) *Attorney, Agent, or Firm* — Sughrue Mion, PLLC

(57) ABSTRACT

A wind protection device for a building has lateral face elements (630) positioned at a distance from an inner building wall (631) creating at least one riser shaft (239) for air. The lateral face element (630) is closed at lateral sides, wherein the wind protection device further has at least one lower air entry element (620, 620') connected to at least one riser shaft (239) and at least one upper virtual ledge (620"; 643) connected to at least one riser shaft (239) having an outlet opening directing the air flow from the connected riser shaft(s) (239) to the area in front and above the respective upper virtual ledge (620", 643). The lateral face element (630) has a sequence (650) of side air entries (651, 651', 651") connected with at least one riser shaft (239).

12 Claims, 22 Drawing Sheets

(51) Int. Cl.
*F03D 9/43* (2016.01)
*F24F 11/30* (2018.01)
*E04H 9/14* (2006.01)

(52) U.S. Cl.
CPC ....... *F24F 11/30* (2018.01); *F05B 2240/9112* (2013.01)

(56) References Cited

U.S. PATENT DOCUMENTS

| | | | | |
|---|---|---|---|---|
| 5,347,779 | A | * | 9/1994 | Jordan ................. F24F 5/0075 52/302.3 |
| 7,909,921 | B1 | * | 3/2011 | Gilbert ................. B01D 46/10 55/350.1 |
| 2010/0242390 | A1 | * | 9/2010 | Lee Lum ............... E04C 1/392 52/302.1 |
| 2013/0014459 | A1 | * | 1/2013 | Elwell .................. E04B 1/70 52/302.1 |
| 2014/0014302 | A1 | * | 1/2014 | Gutai .................. F28D 20/0034 165/104.19 |
| 2014/0026499 | A1 | * | 1/2014 | Bagatelos ............. F24S 25/632 52/173.3 |
| 2015/0059828 | A1 | * | 3/2015 | Asci ........................ E04B 2/88 136/246 |
| 2015/0121786 | A1 | * | 5/2015 | Carr ...................... E04B 1/7076 52/302.1 |
| 2018/0148929 | A1 | * | 5/2018 | Parra Saavedra ....... E04C 1/392 |
| 2019/0242149 | A1 | * | 8/2019 | Buonpane ................ E06B 9/02 |

FOREIGN PATENT DOCUMENTS

| | | |
|---|---|---|
| DE | 201 20 330 U1 | 4/2003 |
| DE | 10 2005 038 490 A1 | 2/2007 |
| DE | 10 2014 116 775 A1 | 5/2016 |
| JP | 2013-153658 A | 8/2013 |
| WO | 85/02668 A1 | 6/1985 |
| WO | 2008/090421 A1 | 7/2008 |
| WO | 2014/065480 A1 | 5/2014 |

* cited by examiner

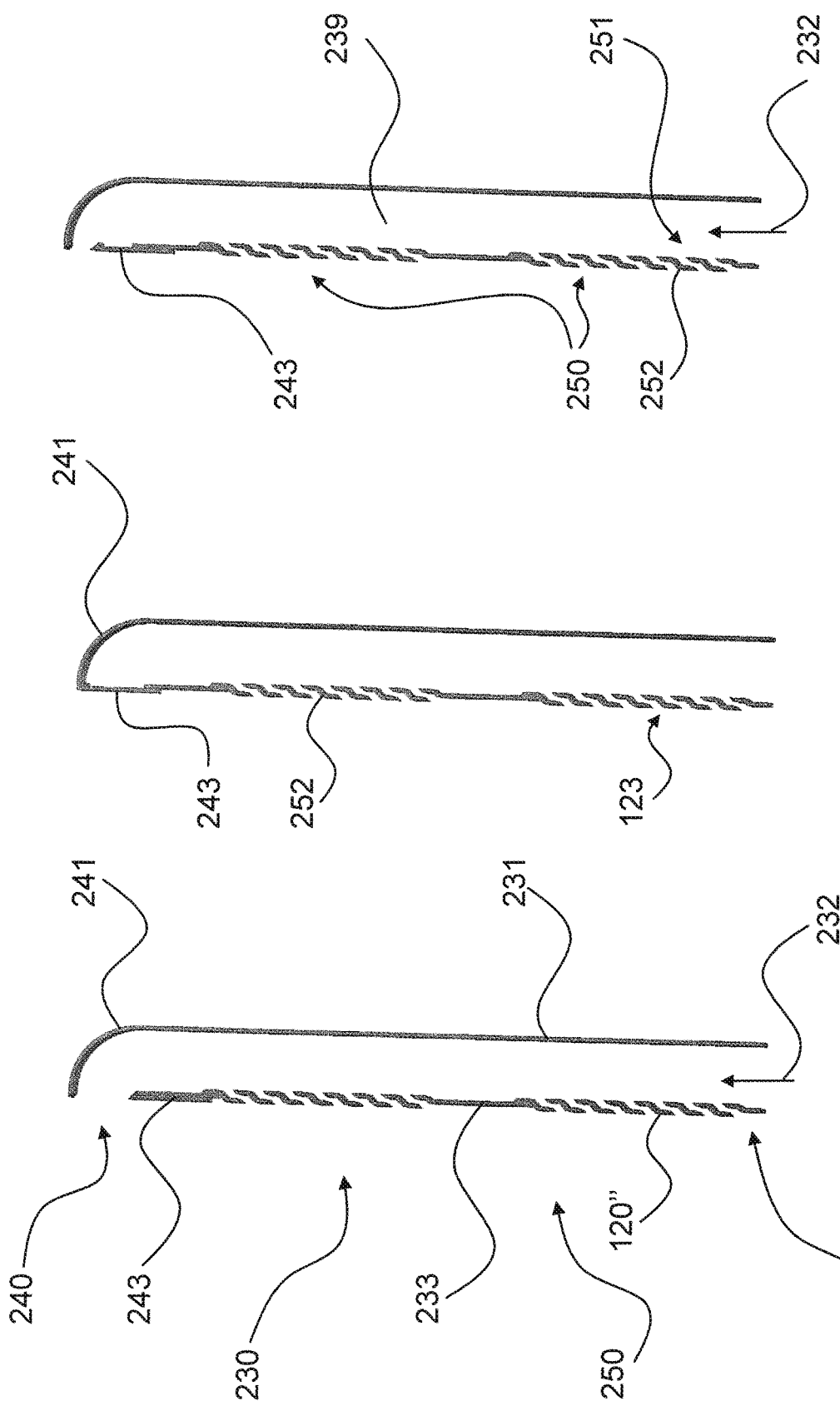

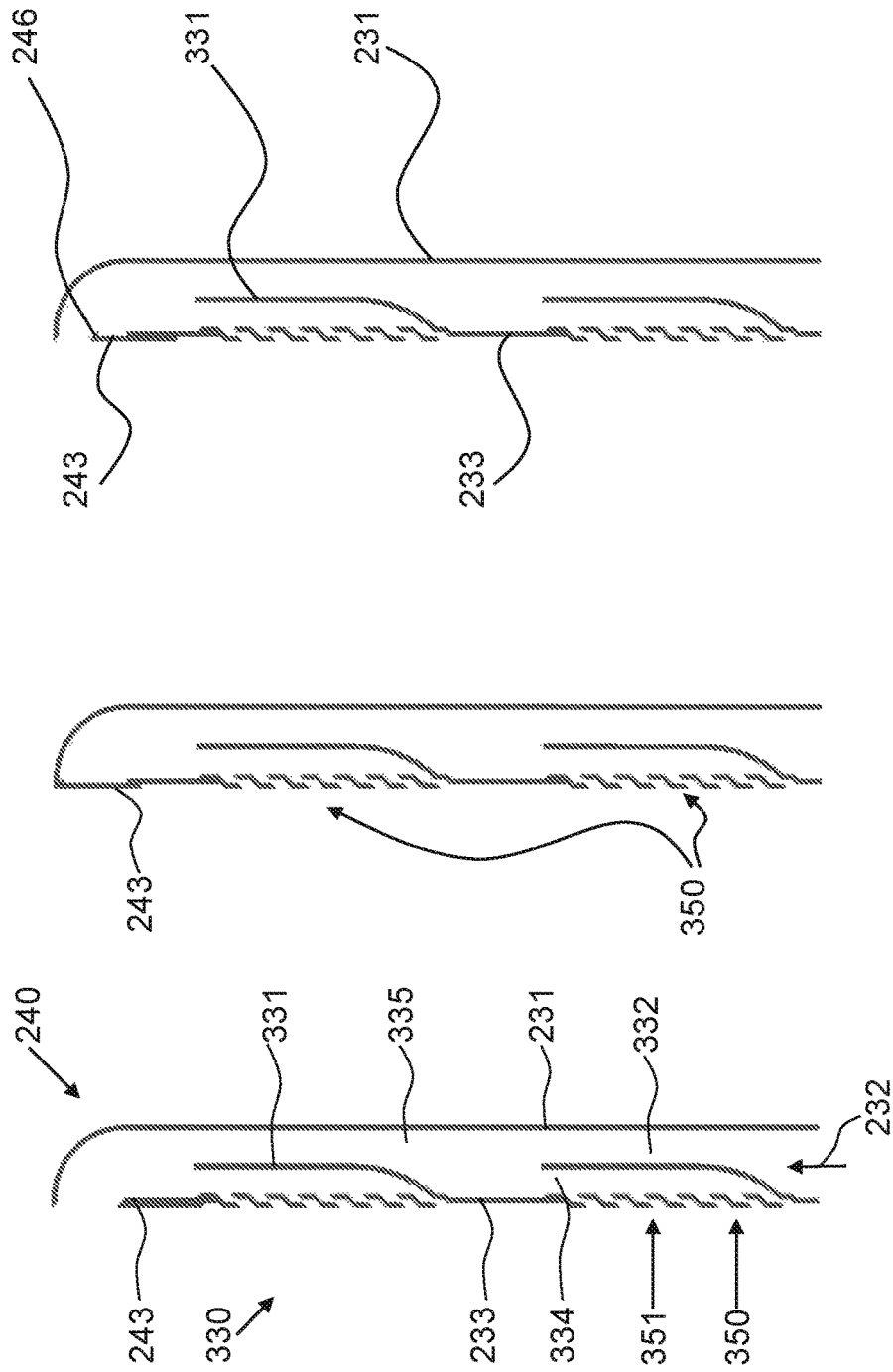

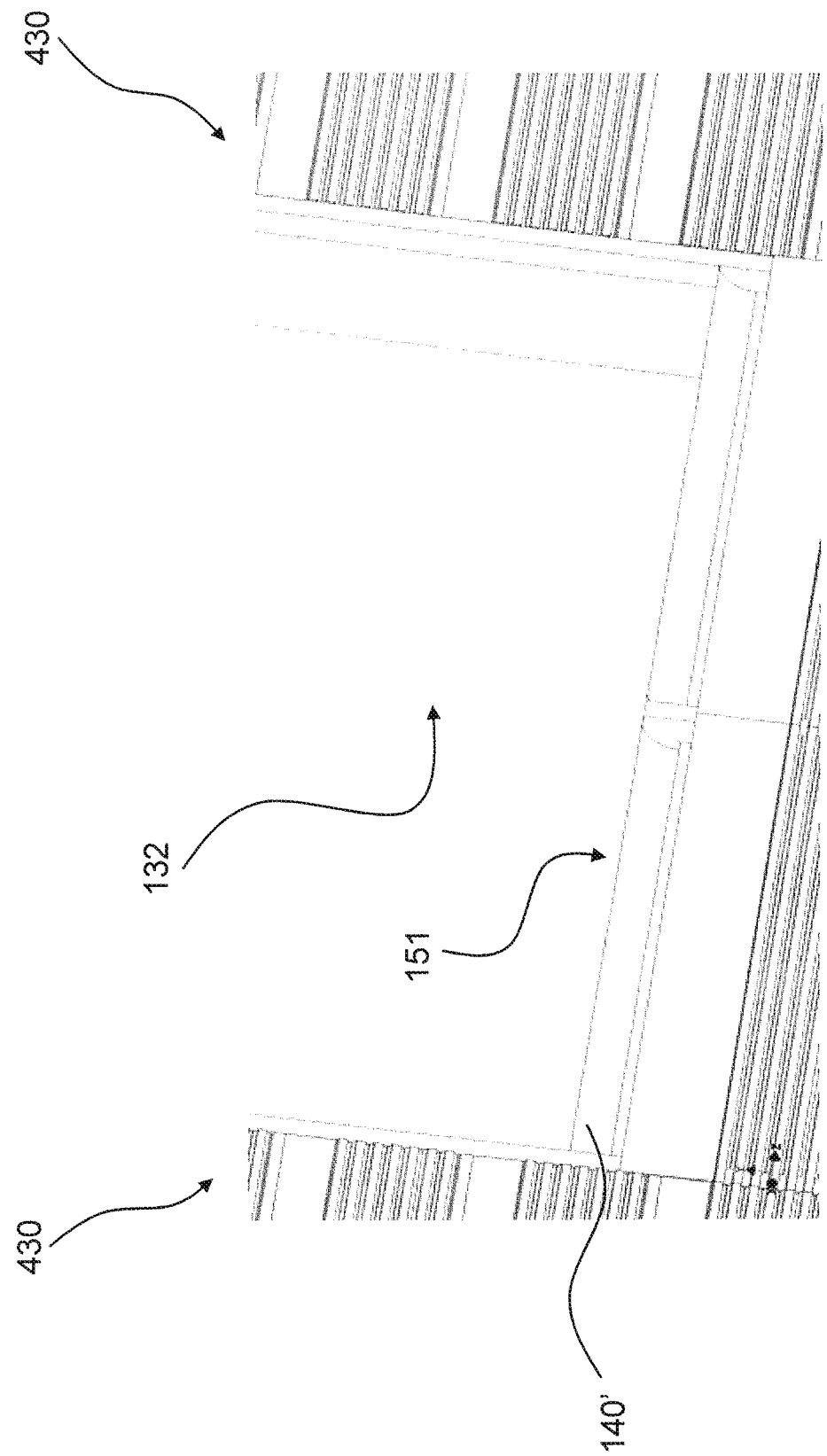

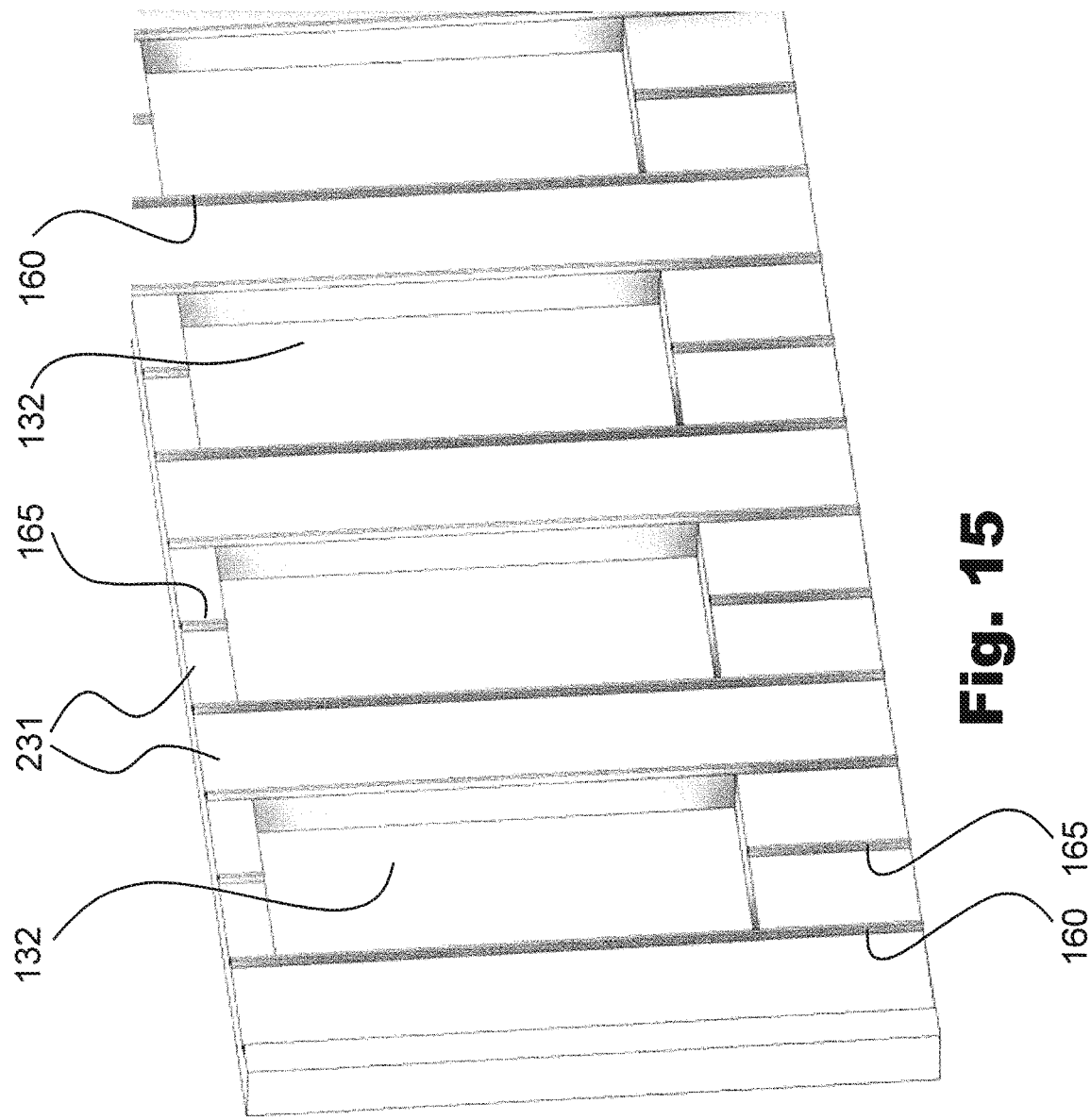

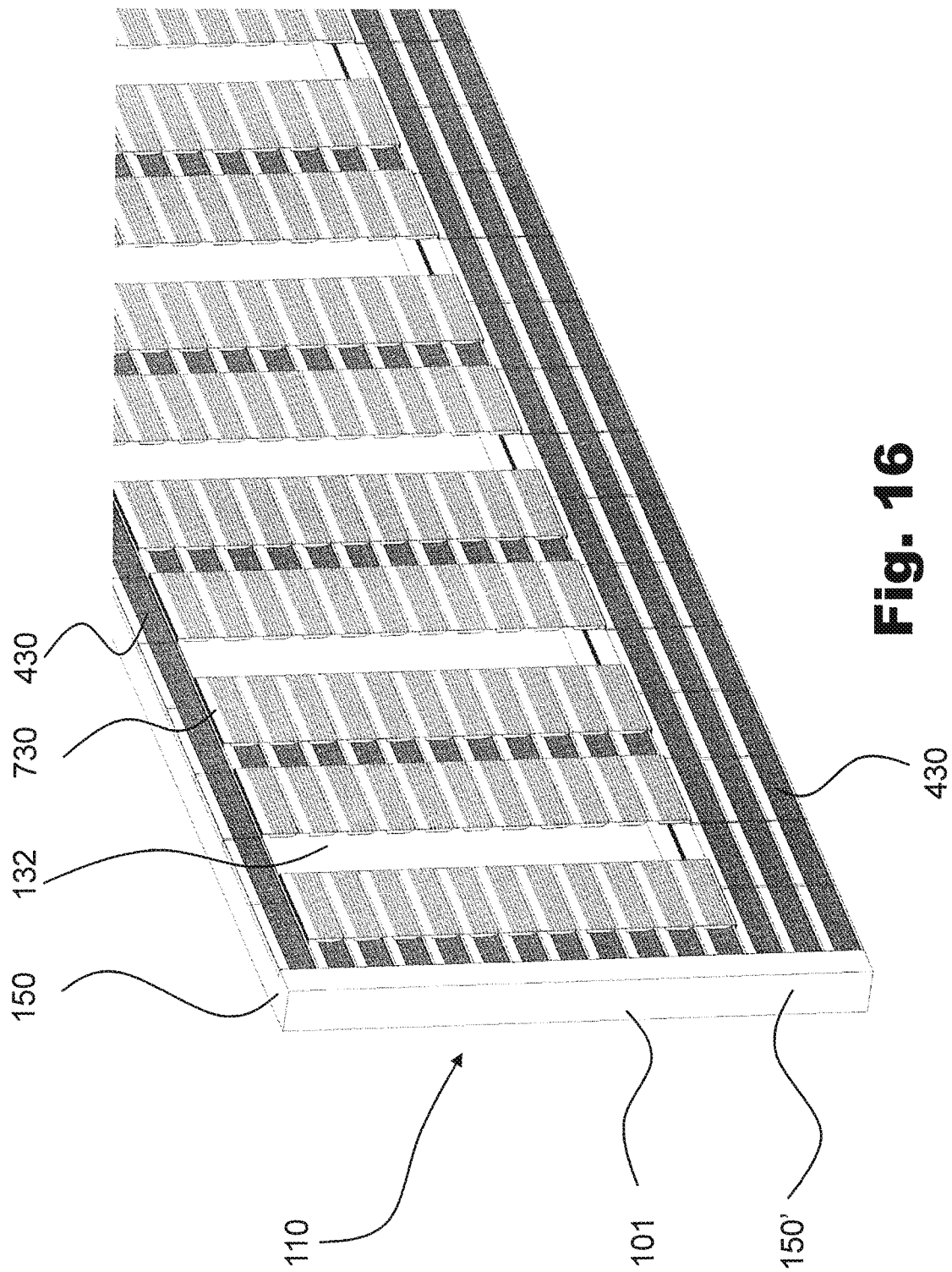

WIND PROTECTION DEVICE FOR A BUILDING

CROSS REFERENCE TO RELATED APPLICATIONS

This application is a National Stage of International Application No. PCT/EP2018/059482 filed Apr. 12, 2018, claiming priority based on European Patent Application No. 17166550.8 filed Apr. 13, 2017.

TECHNICAL FIELD

The present invention relates to a wind protection device for a building having a front wall positioned at a distance from the building wall creating a riser shaft for air.

PRIOR ART

A structure capable of reducing strong wind pressure is known from WO 2014/065480 which contains a plurality of hexagonal blocks vertically and horizontally stacked in one or two rows at a distance in front of various structures to be protected, e.g. temporary buildings or vehicles on a road, or rail and port facilities.

A wind guard device is known from WO 85/02668 arranged in an air exchange passageway between a building and the surrounding atmosphere, such as a ventilation chimney, for maintaining a gentle flow of gas therein.

A wind energy system for a building according to DE 201 20 330 U1 has wind wheels in a tower and airtight channels, conducting tubes and shafts in the building which exit the tower and lead to sides of the building and the tower where wind suction is generated. Air is sucked into the tower through inlet shafts provided at the building walls, is guided over the wind wheels to produce compressed air or electrical energy, and exits through the above-mentioned channels, conducting tubes and shafts.

DE 297 05 912 U1 provides a sequence of wind wheels behind a cover panel positioned at a corner of a building at a distance from the walls adjacent to the corner and reaching from the ground to the roof.

CN 20 349 95 07 U discloses a perforated glass window in a frame body fixedly arranged on the wall of a building. An inner sliding window can be opened for ventilation of the room.

DE 10 2014 116 775 A1 discloses a façade element, in particular a lamella-type façade element, comprising a front side having at least one through-opening, at least one guiding element being provided in the region of the at least one through opening for guiding a fluid flowing against the façade element and streaming through the through-opening, in order to deflect a flow direction of the fluid in the through-opening. Further, a building having a façade device arranged at its front side and including at least one façade element of this kind is disclosed as well as a method of using a fluid streaming against it. To this end, the guiding elements of façade elements are configured to deflect and guide the fluid into a nozzle device in which a wind generator unit is arranged for transforming the energy of the fluid accelerated in the nozzle device into another form of energy such that the wind energy can be used in another form.

DE 10 2005 038 490 A1 discloses a device for energy generation at building front sides. The building front side includes one or more flow channels, specifically formed between an inner and outer shell of a double-wall front side. A wind energy generator is arranged in the flow channel in its region streamed by the air. Specifically, the flow channels can be arranged and configured so as to use thermal lift or pressure gradient induced by wind. Specifically, the wind energy generator may be configured to be electrically driven to be optionally used as a smoke extractor.

SUMMARY OF THE INVENTION

Based on this prior art, it is an object of the present invention to provide an improved protection of a building against wind forces. This can include enhanced protection of structures on a roof of a building and or window surfaces.

According to the invention, a wind protection device for a building is provided having a lateral face element positioned at a distance from an inner building wall creating at least one riser shaft for air, especially when the lateral face element is closed at its lateral sides.

The lateral closure can be one panel of such a lateral face element or it can be open from corner to corner of the building or additional separating vertical fins are provided. The wind protection device further comprises at least one lower air entry element connected to at least one riser shaft and at least one upper virtual ledge connected to at least one riser shaft comprising an outlet opening directing the air flow from the connected riser shaft(s) to the area in front and above the respective upper virtual ledge. The lower air entry element can be a horizontal or a vertical grid and the upper virtual ledge can be a horizontal or a vertical opening having a grid or not.

Each lateral face element comprises at least one sequence of e.g. 5 to 20 side air entries connected with at least one riser shaft. Such side air entries can have each a height of several centimetres and are extending as horizontal webs from one lateral side of the lateral face element to the other, but can also be supported with vertical webs.

Such a plurality of sequences of side air entries can be provided at each storey of the building, especially below a window sill and between window surfaces.

Behind each sequence of side air entries, a riser shaft separation wall (also denoted herein as intermediate wall) is provided being attached below said sequence and having a free end at the uppermost air entry of the respective sequence. In other words, the separation wall has in a cross section view a shape of a J.

A plurality of sequences of side air entries can be provided one mounted on the other in the direction perpendicular to the plane of the front wall of the lateral face elements allowing for an airflow directed to an inner or innermost riser shaft. Then any airflow from the outside initially enters into the first stage or layer of the lateral face elements, is redirected to rise in front of the riser shaft separation wall, is then combined with air added from below to be able to enter through inner side air entries of the next layer or stage until the bottommost layer or until the upper virtual ledge opening is reached.

The lower air entry element can comprise at least one base element from the group encompassing a vertically oriented grid creating a cavity behind it in front of the building wall or a horizontally oriented grid positioned under a portion of one of the riser shafts.

The vertically oriented grid is preferably a structure provided around the building at all exterior walls, whereas the horizontally oriented grid is usually provided at the underside of separated lateral face elements.

The upper virtual ledge can comprise at least one outlet from the group encompassing an opening block having a curved surface starting, in a cross section view, from a vertical orientation of its lower portion parallel to the building wall and going over to an orientation of its upper portion oriented to the exterior of the building, or an opening oriented perpendicular to the air flow in the associated riser shaft.

It is possible that the horizontally oriented grid of a lower air entry element is positioned near or associated to an upper virtual ledge of a lower storey. In this sense "lower" in connection with an air entry element is related to the corresponding lateral face element which can create an ongoing riser shaft, which is interrupted when the lateral face element can slide in a horizontal direction (as explained further below).

The at least one outlet mentioned above can comprise a movable shutter adapted to fully or partially close the outlet. If the movable shutter is fully closed, then the air flow in the riser shaft completely stops, beside any vertical air flow leaving the riser shafts at horizontal ledges unless a movable grid shutter is also provided there (not shown in the drawings).

Upper virtual ledges can be provided at several different height positions at the building from the following group: under the roof, under a window, or at predetermined horizontal storey lines.

The riser shafts can be separated by fins connected to the building wall and window areas, especially connected in a heat conducting way and fully or partly closing the areas against lateral airflow. If the fins are closed for lateral airflow, then they create a more laminar vertical air flow between these parallel fins, wherein optionally the fins are made of heat conductive material providing a heat exchange between the air in the riser shafts and the building structure.

At least one lateral face element can be a sliding lateral face element which can be positioned in front of a window, wherein the sliding lateral face element then comprises at least one sequence of side air entries connected with a cavity behind the sliding lateral face element. This allows to slide the sliding lateral face element as lateral face element in front of the window and protect it directly or to slide it in front of an associated lateral face element beside a window creating an additional layer or stage as explained above.

The sliding lateral face element can further comprise a lower horizontal air entry and/or a back wall. The back wall would isolate the airflow in the related cavity from the window, whereas in absence of the back wall the window would serve as back wall of the building.

The sliding lateral face element can further also comprise an intermediate separation wall (also denoted herein as intermediate wall or as riser shaft separation wall) for every sequence of side air entries, wherein these side air entries are positioned at the same height as in above-mentioned associated lateral face elements positioned sideways of the window.

A sequence of vertically oriented micro-turbines can be arranged one beside the other along one or more different heights in the riser shaft.

Finally the front wall and especially the side air entry structures of lateral face elements can comprise additional photo-voltaic elements contacted through side connections.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIGS. 5A to 5C show schematic cross-sectional side views of a lateral face element for a wall of a building comprising an embodiment of an integrated upper virtual ledge;

FIGS. 7A to 7C show schematic cross-sectional side views of an embodiment of a lateral face element according to the invention, some basic details being similar to FIGS. 5A to 5C;

FIG. 11 shows a detailed partial perspective view of a window accompanied by a left and right lateral face elements mounted in a sliding horizontal relationship on the building wall;

FIG. 15 shows a schematic perspective side view of part of a storey of a building with four windows and a building wall being a back wall for lateral face elements;

FIG. 16 shows a schematic perspective view of a side wall of a building starting from a corner and including a plurality of windows, a plurality of lateral face elements and sliding lateral face elements adapted to completely cover the respective windows;

DESCRIPTION OF PREFERRED EMBODIMENTS

Figure 1A:
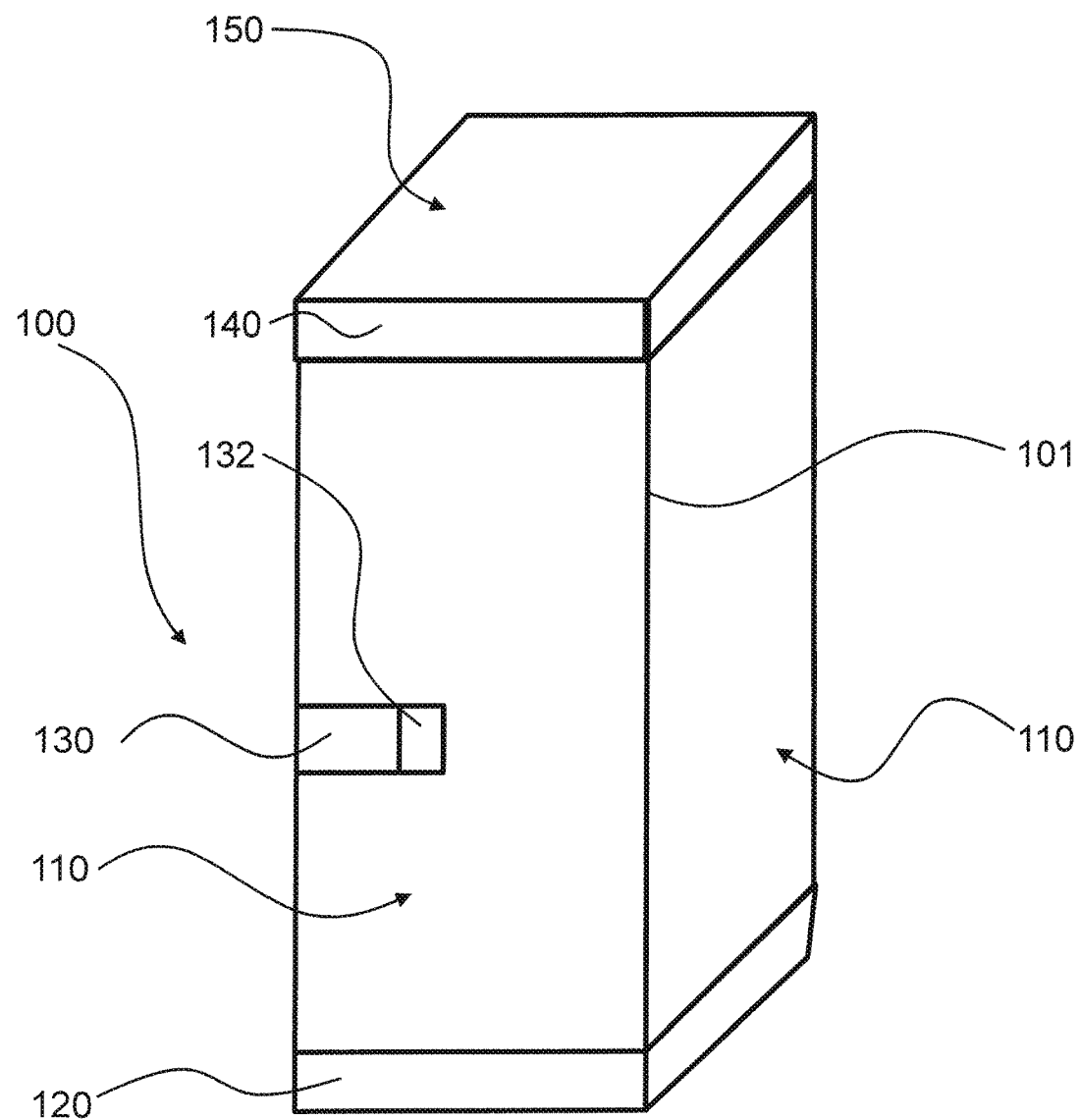
FIG. 1A shows a schematic perspective view of a building reflecting the general layout of embodiments according to the invention.

FIG. 1A shows a schematic perspective view of a building 100, reflecting the general layout of embodiments according to the invention. The building 100 is usually a multi-storey building, having different side walls 110 and a roof structure 150. The building protection elements described within the different embodiments herein are related to a lower air entry element formed by a base element 120, usually provided at the ground floor or at one of the lower storeys, followed by lateral face elements 130, distributed over the side wall 110 of the building until an upper virtual ledge 140 provided especially just under the roof 150, usually at the last top storey of the building 100. The lateral face elements 130 are usually provided separately for each storey 131 (cf. FIG. 1B) and may comprise lateral face elements around surfaces of windows 132 shown as detail elements in FIG. 1B. The base elements 120 can also be provided at further inlet points, e.g. under the windows as well as above the windows.

Figure 1B:
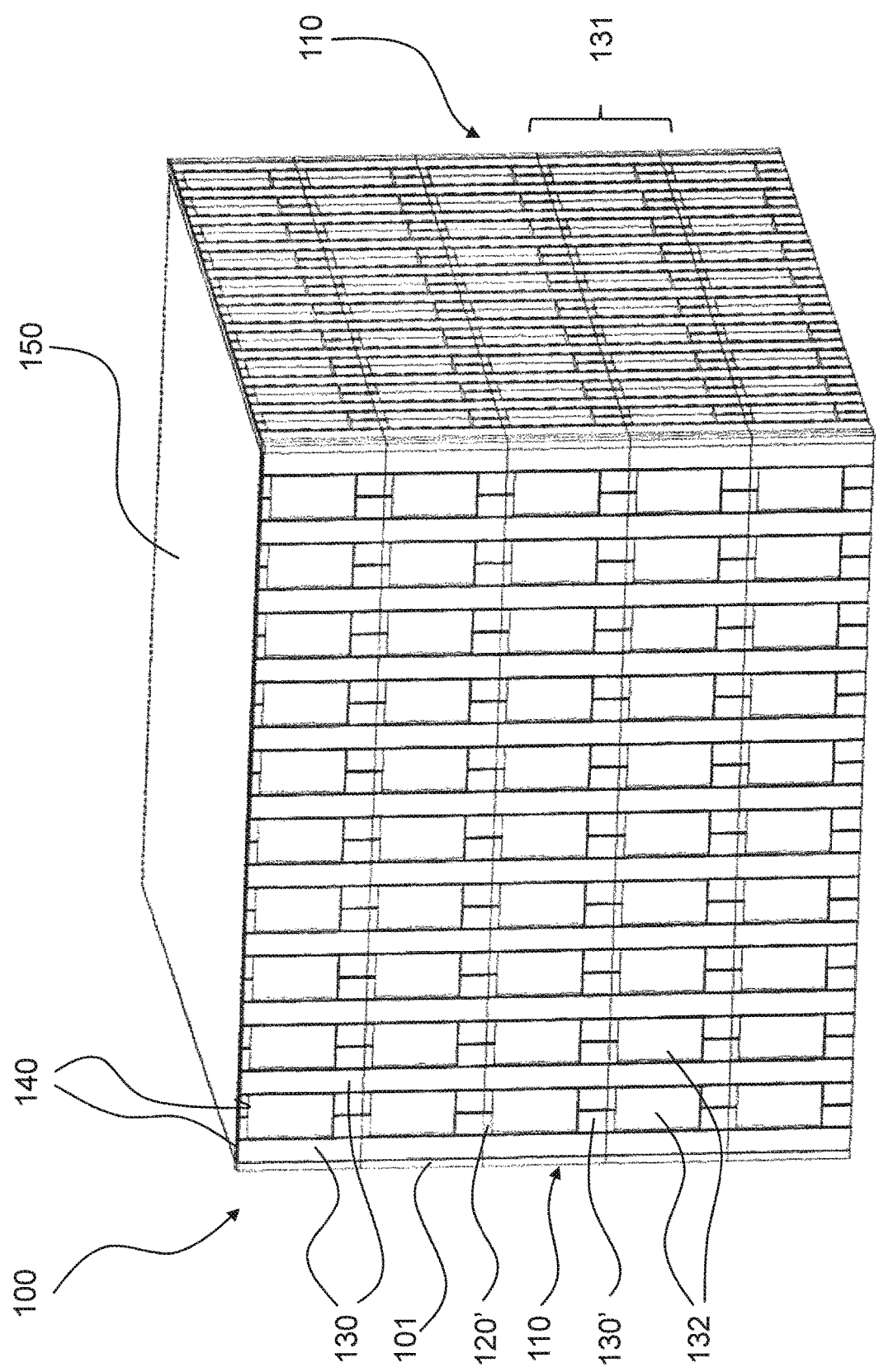
FIG. 1B shows a schematic perspective partial view of the building according to FIG. 1A reflecting a more detailed view of embodiments; of a base element according to the invention.

FIG. 1B shows a schematic perspective partial view of the building with five stories 131 according to FIG. 1A reflecting a more detailed view of the windows 132 and embodiments of base elements 120', lateral face elements 130 and 130' and upper virtual ledges 140. Here, base elements 120' are positioned above windows 132. Lateral face elements 130 are extending beside the windows along all five stories 131 and upper virtual ledges 140 are integrated all around the wall sides 110 below the roof 150. The buildings of FIGS. 1A and 1B have a rectangular shape, i.e. four side walls in a 90° angle. This is of course not necessarily the case in other embodiments. The surface of the building can be rounded like e.g. for the 30 St Mary Axe building in London (called The Gherkin), i.e. the building may have rounded tower-like walls and windows and also possess an uneven, i.e. curved surface in the vertical direction. The present disclosure can relate to a building without windows or to a tower or a column serving as a stand for another structure on top of it, such as a communication tower or lighthouse.

Figure 2:
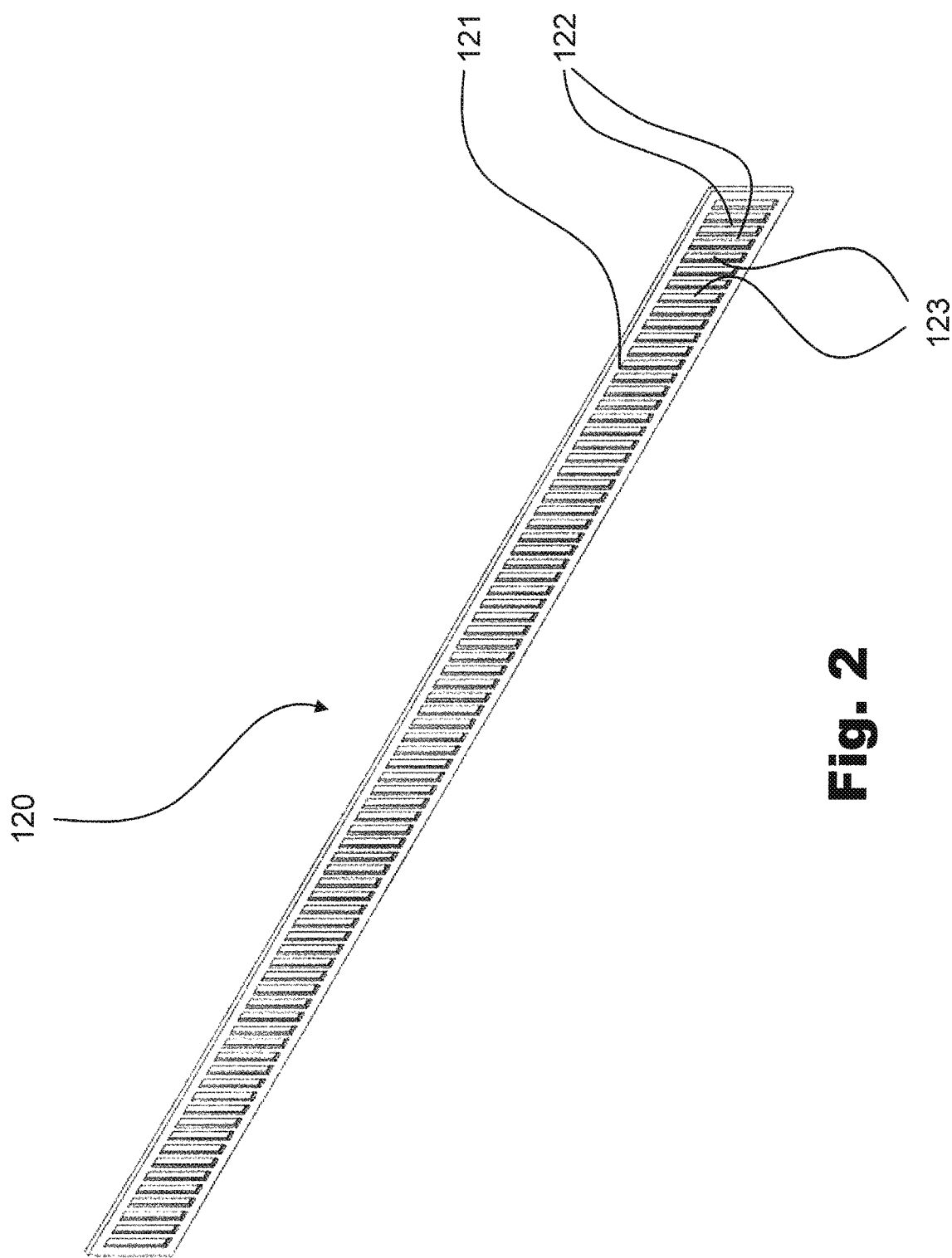

FIG. 2 shows a schematic perspective view of the exterior part of an embodiment of a base element 120, provided in the embodiment of FIG. 1 A/B along one side wall 110 of the building 100. The exterior part of the base element 120 can be a grid extending from one corner 101 of the building 100 to the other. The length of the grid can be 10 metres and more. Behind the grid there is a cavity which will have a bottom surface, side walls and a back wall. The depth of the cavity will be essentially similar to the riser shaft 239 which will be described later on. The base element (grid) 120 has a surrounding frame 121 with vertical webs 122 and intermediate openings 123. Air entering through the openings 123 into said cavity rises in said shaft to leave the structure at the upper virtual ledge 140. Such base elements 120 can be provided, e.g. as intermediate base elements 120' (cf. FIG. 1B), under or above windows 132 along parts of the side wall 110 of the building 100.

Figure 3:
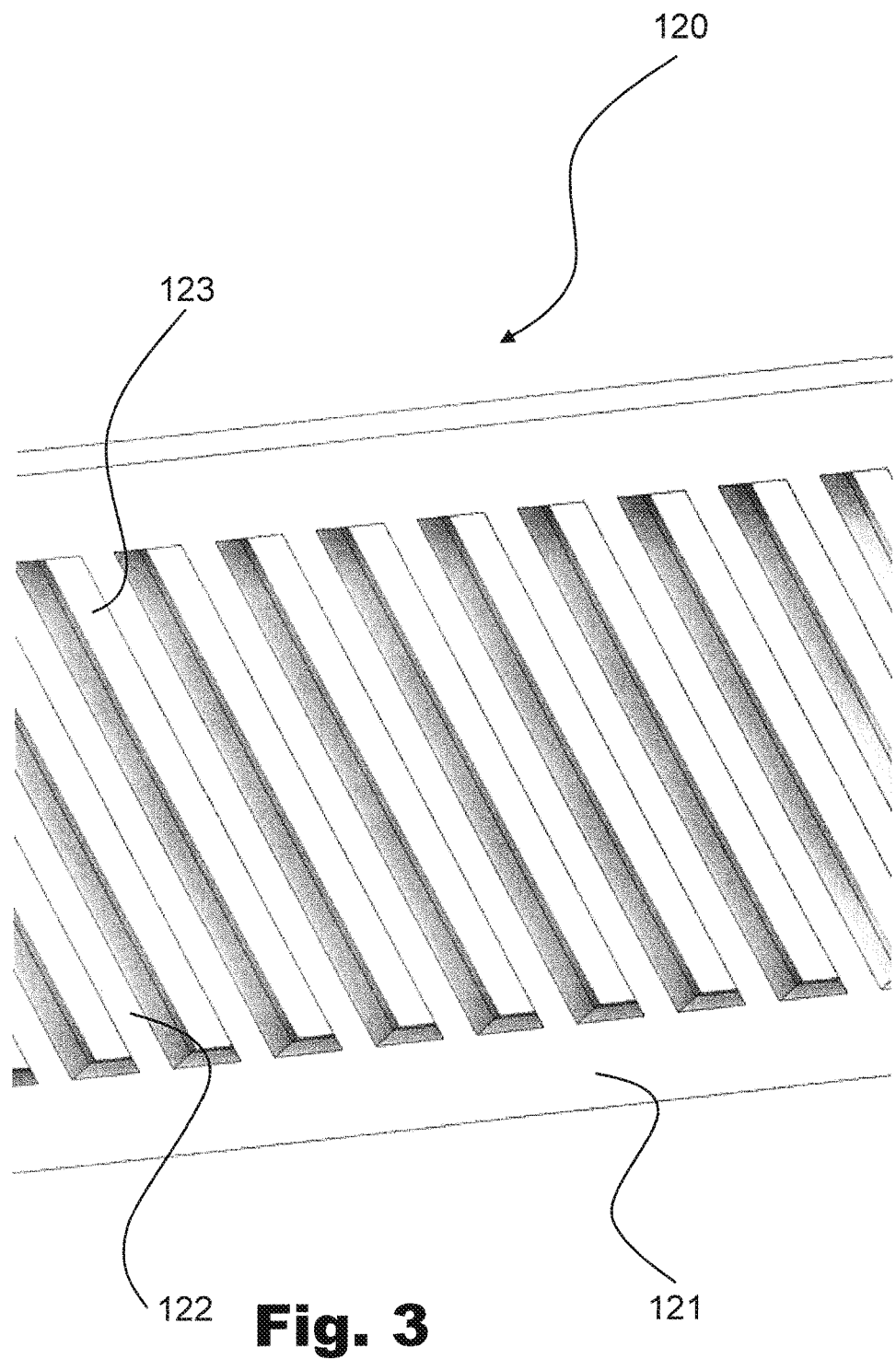
FIG. 3 a schematic perspective detail view of FIG. 2 as seen from the inside of the building.

FIG. 3 shows a schematic perspective detail view of the base element (grid) 120 of FIG. 2 as seen from the inside of the building 100. The webs 122 between the horizontal parts of frame 121 can have preferably a height of 0.5 to 2 metres, usually up to the height of one storey, i.e. typically approximately 3 metres The distance between adjacent webs 122 is between 1 and 3 times their width, e.g. 5 to 20 centimetres. Here, seen from inside, the webs 122 are flush with the frame portions 121. The height and width of the base elements (grids) 120 as well as of the lateral face elements are determined on the basis of the layout of the building, e.g. relating to the height of the stories 131, which can be e.g. 3 metres with a clearance of 2.5 metres and 0.5 metres floor or roof. Of course, different heights and widths are possible.

Figure 4:
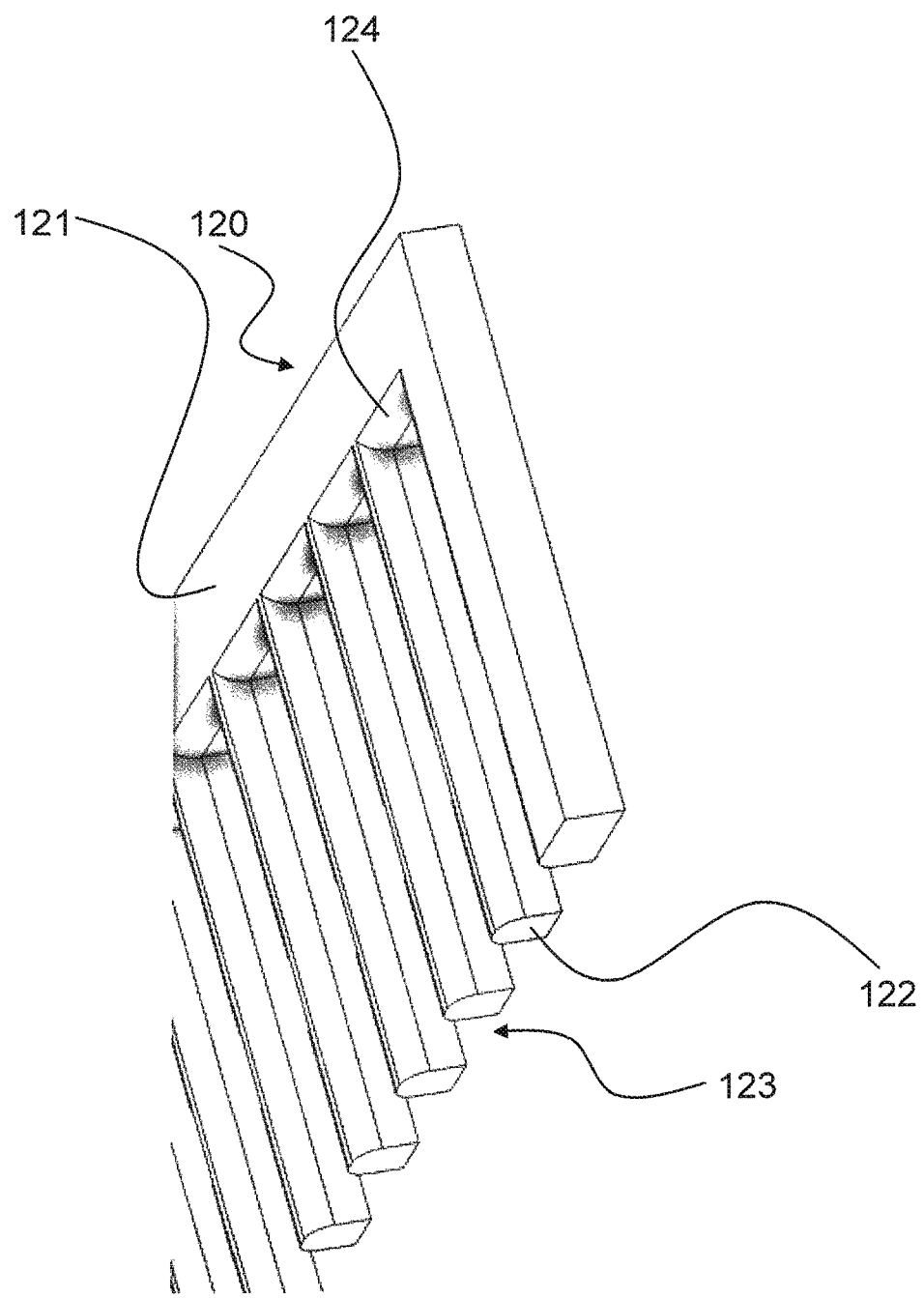
FIG. 4 shows a further perspective detail view of FIG. 2 as seen from the outside of the building.

FIG. 4 shows a further partially cross-sectional perspective detail view of the base element 120 of FIG. 2 as seen from the outside of the building 100. It can be seen that the webs 122 are rounded on the outside with a small surface edge flush with the frame 121. The rounded portions can be quarter-spherical or elliptical with the higher inclination directed to the inside enabling an easy entry of air through the openings 123. The curved portions are also extended to the frame 121 side entry surfaces 124. The webs 122 already provide a directional effect on the air since crosswinds are directed vertically to the building side wall plane. The openings 123 can be covered by a mesh to avoid entry of objects like leaves or animals into the riser shafts 239.

FIG. 5A to FIG. 5C show schematic cross-sectional side views of some features of a basic layout of a lateral face element 130 of FIG. 1A/B arranged on or integrated into the side wall 110 of the building 100 (with the reference numerals of FIG. 1A/B), and especially show some basic features of simple lateral face elements 230 comprising an embodiment of an integrated upper virtual ledge 240 with three different positions of a shutter wall (i.e. movable shutter) 243. Further features of lateral face elements according to the invention will be explained with reference to FIGS. 7A-7C further below. FIG. 5A shows a possible basic multi-storey-solution for a lateral face element 130/230 for which, here, two sequences 250 of side air entries 251 shaped as slits are shown. These sequences 250 can be related to a single storey or to multiple storeys. FIG. 5A to FIG. 5C are related to two storeys.

The lateral face element 230 comprises a back wall 231 (formed e.g. by a building wall) which is directly connected to a rounded virtual ledge wall 241 at the top. At the bottom, the lateral face element 230 is positioned above the base element 120 (e.g. as shown in FIGS. 1-4), or the lower sequences 250 in FIG. 5A serves as a base element 120" so that any air entering between the openings 123 of such a base element 120" is guided in an essentially laminar flow according to arrow 232 upward in front of the back wall 231.

A front wall 233 of the lateral face element 230 can be provided in the vertical direction between the base element 120 and the upper virtual ledge 240. It preferably comprises a plurality of sequences 250 of side air entries 251 which are separated by horizontally oriented webs 252. The webs 252 have—in a cross-sectional view—the form of a front slat parallel to the side wall 110, followed by a transfer portion directed inside and ending with a back slat parallel to the side wall 110 and positioned at least partly behind the front slat of the next web 252, creating said openings, i.e. side air entries 251 for an additional air flow streaming from air blowing against the side wall 110 of the building 100 at the height position of the sequence 250 of side air entries 251.

Air entering through the side air entries 251 adds to the laminar air flow in the direction of arrow 232 and accelerates this enhanced air flow up to the virtual ledge wall 241. A movable shutter formed as a closing shutter wall 243 is positioned on the front wall 233, wherein said shutter wall 243 is shown in FIG. 5A in its open configuration. FIG. 5B shows the embodiment of FIG. 5A with a closed shutter wall 243, so that the air flow, rising up according to arrow 232, comes to a stop. FIG. 5C shows a partially opened closing shutter wall 243, allowing an air flow, according to arrow 232, to evacuate from the chimney-like riser shaft 239 between back wall 231 and front wall 233.

Figure 6B:
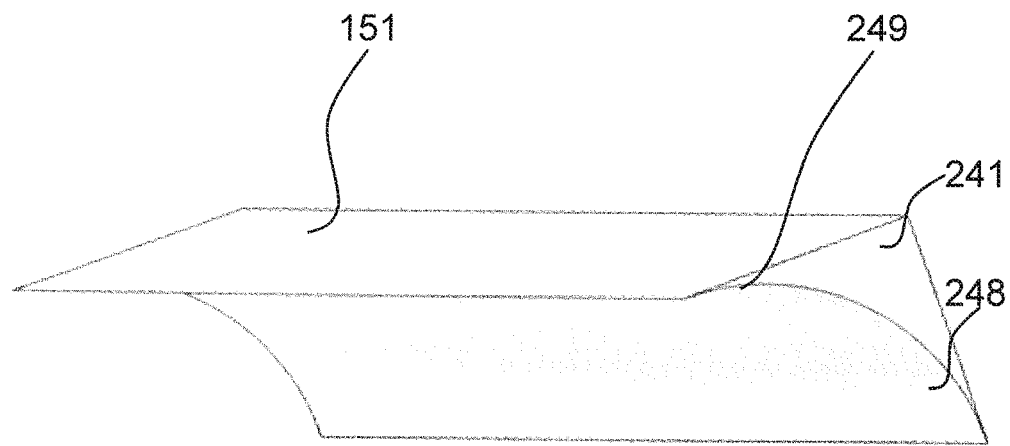
FIGS. 6A and 6B show a schematic perspective detail view of a closing shutter wall of an upper virtual ledge as well as a schematic perspective detail view of a rounded ledge wall.
Figure 6A:
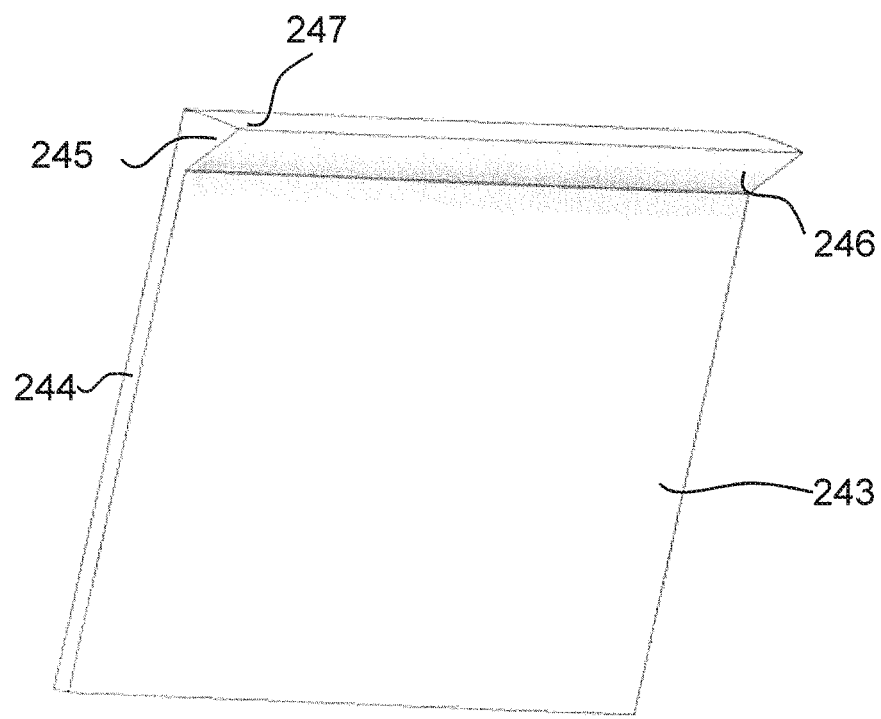

FIG. 6A shows a schematic perspective detail view of the closing shutter wall 243 of FIGS. 5A to 5C, and FIG. 6B shows a rounded virtual ledge wall 241 (also denoted herein as an opening block of the upper virtual ledge) in a more detailed view.

The outer surface of the closing shutter wall 243 is a plain surface 244, oriented to the outside of the building 100. The opposite side is mounted in a vertically sliding manner on the outside of the front wall 233 of the lateral face element 230. This can be achieved by guide rails, not shown in the drawings. The upper edge 245 of the closing shutter wall 243 has, in its cross-sectional view, a triangular shape, having an inwardly directed protrusion 246 which preferably ends flush with the inner side of the front wall 233 when the closing shutter wall 243 is fully open as shown in FIG. 5A, but presents an obstacle to the vertical air flow when the shutter wall 243 is partially closed as shown in FIG. 5C and provides an upper sealing surface 247 against the rounded end of the virtual ledge wall 241 in the closed position of FIG. 5B.

FIG. 6B shows a schematic perspective view of the rounded virtual ledge wall 241 in a more detailed manner, where it is clear that the lower portion 248 of the virtual ledge wall is starting from an angle parallel to the back wall 231 and is continuously curved up to the upper portion 249. The upper edge 151 of the upper portion 249 as shown in FIG. 6B is in parallel to the roof surface 150 of the building (cf. FIG. 1A/B), so that an air flow in the riser shaft 239 is oriented essentially horizontally when leaving the building at the upper virtual ledge 140 or 240.

However, it is possible, in other embodiments, to provide a different output angle for the upper portion 249 of the upper virtual ledge 240; especially, this angle could be 45° so that the airflow is essentially directed at an angle of about 45° towards the region above the roof 150 of the building 100. The angle can also be chosen between 30° and 60°.

It is also possible to provide a protrusion 246 different from that of FIG. 6A. Especially, this protrusion 246 can be oriented in the opposite way having the same inclination as the upper portion 249 of the rounded virtual ledge part. In other words, when the upper portion 249 of the upper virtual ledge 240 provides an angle of 45°, then the upper edge 245 of the closing shutter wall 243 can have, compared to the upper portion of the front wall 233, a wall portion being parallel to said upper portion 249.

FIG. 7A to FIG. 7C show schematic cross-sectional side views of an embodiment of a lateral face element 330 according to the invention with three different positions of the movable shutter (here shutter wall) 243. As usual, similar features have received the same reference numerals as provided in FIG. 5A to FIG. 5C. The difference between the basic layout shown in FIG. 5A to FIG. 5C and the embodiment shown in FIG. 7A to FIG. 7C is related to an additional intermediate wall 331 (also denoted herein as riser shaft separation wall) which is attached at the lower end beginning of every sequence 350 of side air entries 351 at the front wall 233 and extends parallel to the back wall 231 for a length which it approximately equivalent to the length of the side air entries 351 of the respective sequence 350. Therefore, in the embodiment according to FIG. 7A, the available space for the air flow which is going up according to arrow 232 is reduces to a smaller space 332 (also denoted herein as reduced diameter portion or back riser shaft cavity), separated from another air space 334 (also denoted herein as front riser shaft cavity) oriented in parallel to space 332, so that both air flows are combined in a portion 335 in the riser shaft 239 between two subsequent sequences 350 of side air entries.

This disposition of intermediate walls 331 allows for a smoother air flow within the riser shaft 239, enhances the laminar air flow and mixes the two air flows at any sequence 350 of side air entries 351 to a combined air flow, which is again forced into the next reduced diameter portion 332. The upper virtual ledge part 240 is identical to the upper virtual ledge part 240 of FIG. 5A to FIG. 5C in the present embodiment. The function of the closing shutter wall 243 according to FIG. 7A to FIG. 7C is identical to the function as in FIG. 5A to FIG. 5C.

Figure 8A:
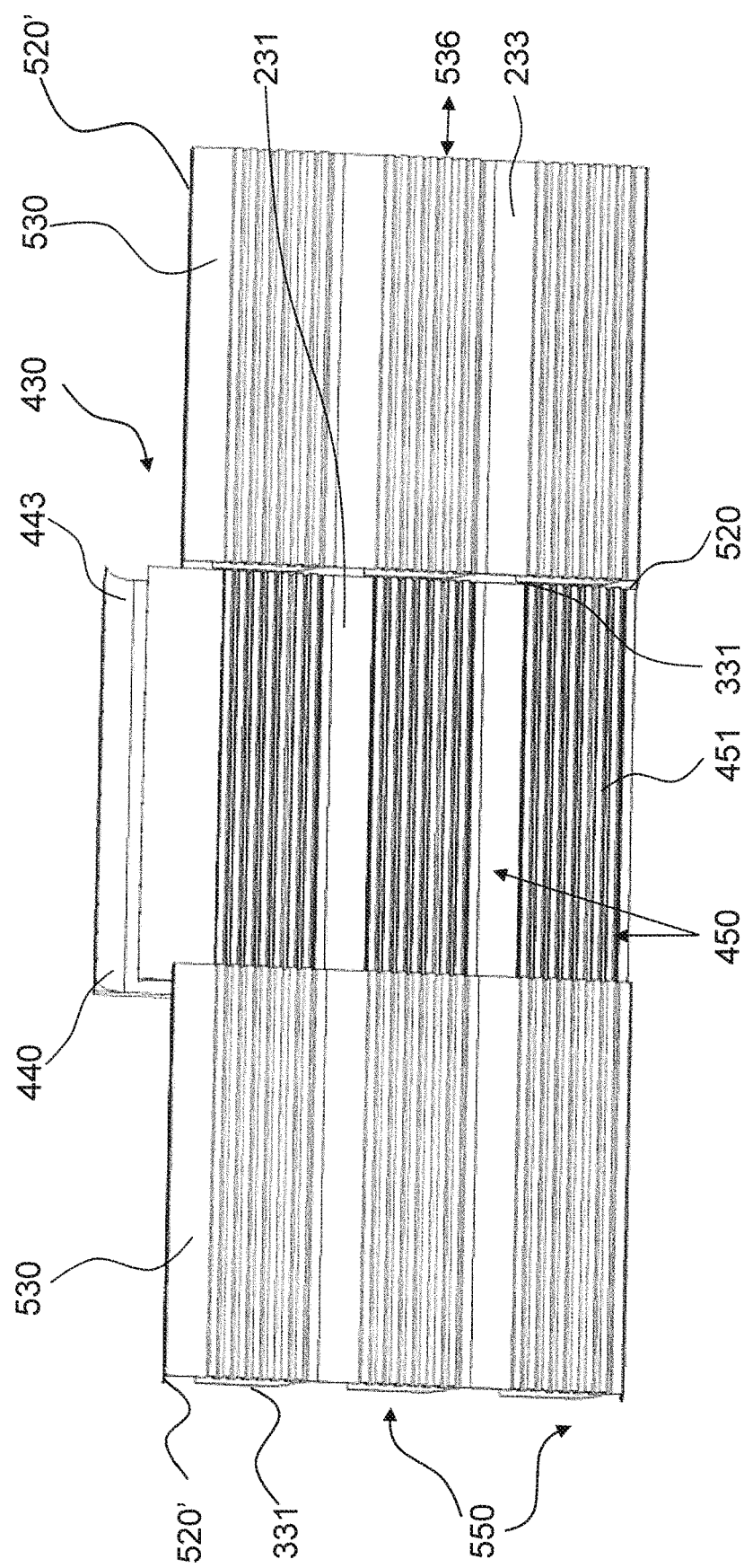
FIG. 8A shows a schematic perspective view on parts of a storey element of a further embodiment of lateral face elements according to the invention.

FIG. 8A shows a schematic perspective view on parts of a storey element of a further embodiment of lateral face elements 430, 530 comprising three groups of sequences 450 and 550 of side air entries 451 which will be described in connection with subsequent figures. At the top of a central lateral face element 430, a upper virtual ledge 440 is provided which is built similar to the embodiment shown in FIG. 6B. This is also true for the closing shutter wall 443 which is mounted above the topmost sequence 450 of side air entries 451.

Beside this central part, two window protection elements 530 (also denoted herein as sliding lateral face elements) are shown. These window protection elements 530 are positioned in front of windows (not shown in FIG. 8A) on the left side as well as on the right side of the central lateral face element 430. These window protection elements 530 are connected in a sliding relationship with the central lateral face element 430 to be moved along the direction of double arrow 536. The back wall 231 of the window protection elements 530 is positioned on the front wall 233 of the central lateral face element 430. FIG. 8A also shows the intermediate walls 331 (also denoted herein as riser shaft separation walls) provided in the side rising shaft. The lower end of the window protection element 530 comprises a lower air entry (here grid) element 520 as well as the upper end of the window protection element 530 comprises an upper grid element 520'.

Figure 8B:
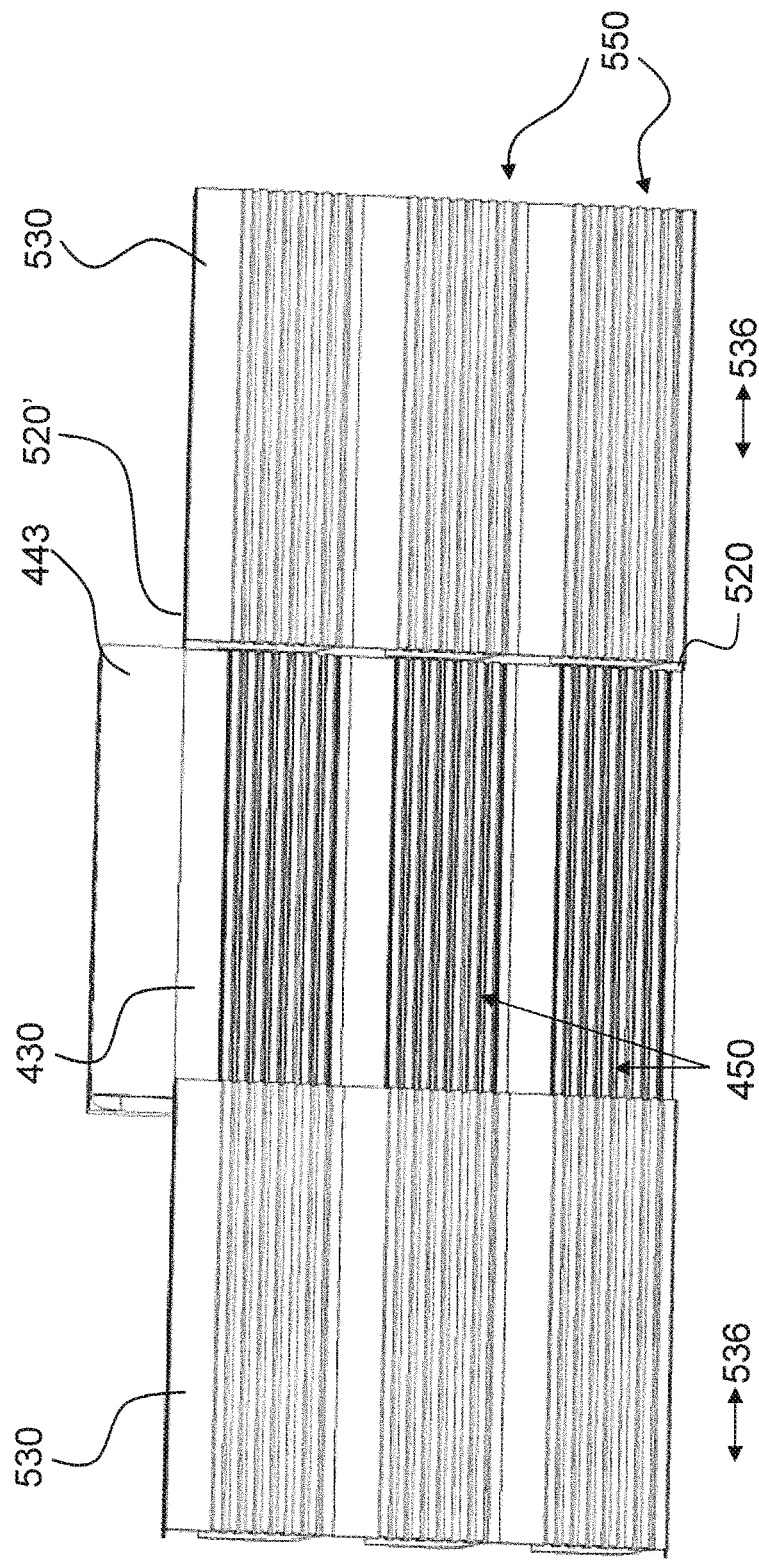
FIG. 8B shows the embodiment of FIG. 8A with the closing shutter wall in closed position.

FIG. 8B shows the same elements as FIG. 8A with the closed shutter wall 443. It can be seen in both FIG. 8A and FIG. 8B that the window protection elements 530 are positioned with the sequences 550 of side air entries in front of respective sequences 450 when the window protection elements 530 are slidably positioned in front of the central lateral face element 430. The upper grid element 520' is then positioned just below the upper virtual ledge 440.

Figure 9:
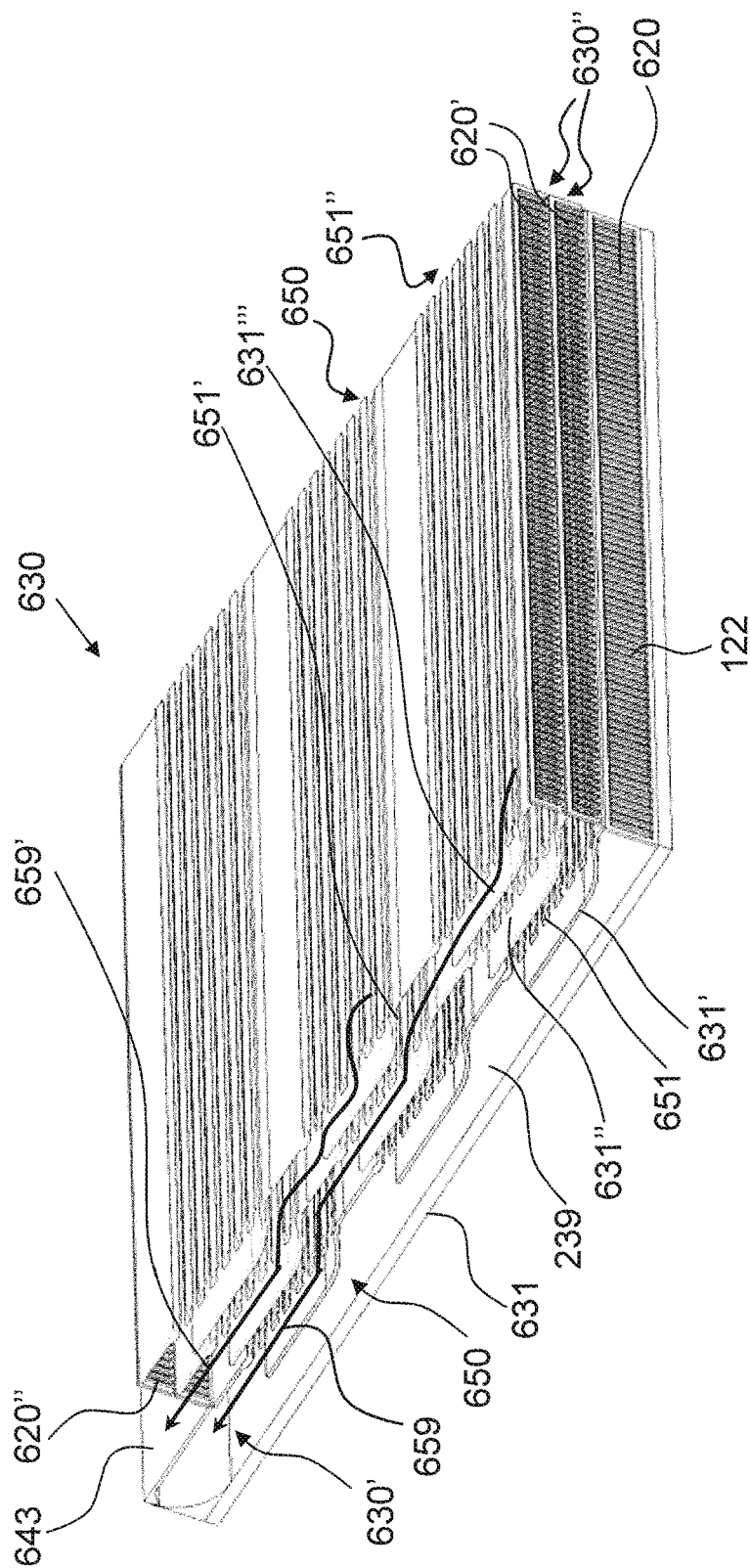
FIG. 9 shows a schematic perspective view onto a further lateral face element with a closing shutter wall.

FIG. 9 shows a schematic perspective view of a further lateral face element 630 with a closing shutter wall 643 (also denoted as movable shutter herein) in closed position.

The lateral face element 630 comprises a back wall 631, being a frame element supporting the entire lateral face element 630. The lateral face element 630 comprises a lower air entry (here grid) element 620 similar to the above-described base element 120 (cf. FIG. 2), allowing an air flow through webs 122 similar so the grid of FIG. 2. However, the lower grid element 620 is oriented horizontally. The riser shaft 239 is partitioned along side air entries 651 by the intermediate wall 631' (also denoted herein as riser shaft separation wall) oriented in parallel to the back wall 631 and positioned essentially in the middle of the free riser shaft separating its width in two equal parts. However, in the embodiment according to FIG. 9, the three sequences 650 of lateral face or side air entries 651 are not forming the outside face of the building 100, but two outer lateral face element layers 630" are provided in front of the initial first or inner lateral face element layer 630' in order to enhance the air flow. They also comprise each a lower grid element 620' and an upper side with an upper grid element 620" arranged side by side to allow an additional air flow out of the top surface of this construction. However, any wind force directed towards the side wall 110 of the building will enter through the top side air entries 651", remain before intermediate wall 631' and will be mixed with any air rising through lower grid element 620' of this outer lateral face element layer 630". Then the combined air flow enters at the next sequence 650 of side air entries 651' into the layer nearer to the building, staying before its intermediate wall 631" to be mixed with air entering through the next level of the lower grid element 620', i.e. that of the next level outer lateral face element layer 630". Finally, at the top side air entries 651 the air is guided in front of the first intermediate wall 631' and will enter the riser shaft 239. The air flow described above is visualized through arrow 659.

Air entering at the outside of lateral face element 630 at a higher level is guided in a similar way according to arrow 659' through the upper horizontal grid element 620" (also denoted herein as outlet opening of an upper virtual ledge). This will still be a functioning outlet, even when the closing shutter wall 643 is closed as shown in FIG. 9.

Figure 10A:
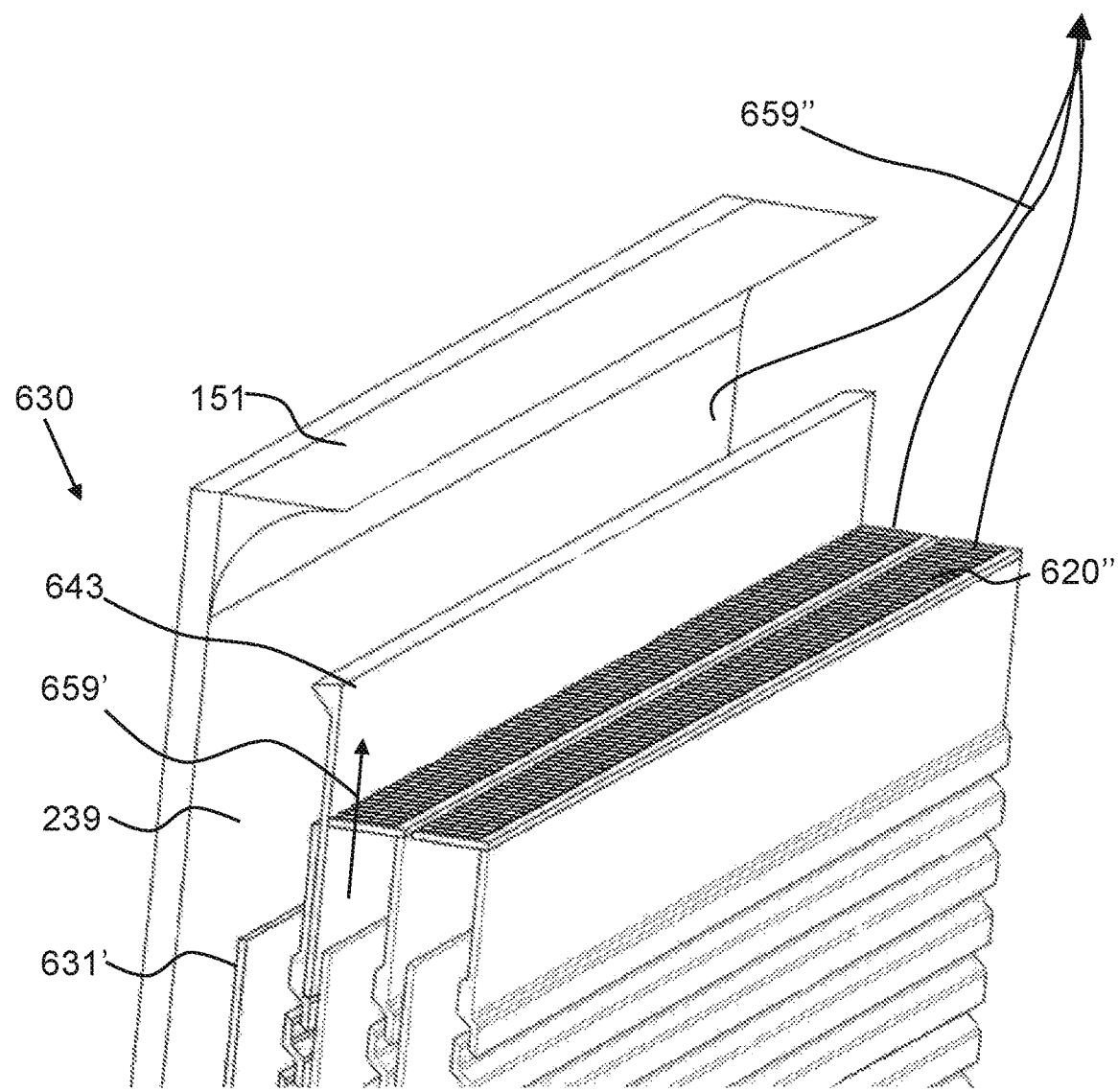
FIG. 10A shows a perspective side view of a detail of the lateral face element of FIG. 9 with the closing shutter wall in the open position.

FIG. 10A shows a detail perspective side view of the lateral face element 630 of FIG. 9 with the closing shutter wall 643 in the open position. The air flow inside the riser shaft 239 leaving the upper virtual ledge as well as the air flow according to arrow 659' (FIG. 9) in outer layers 630" of the lateral face element 630 is combined with the air flow coming through the upper grid elements 620" for combining into a roof protecting or window protecting air flow 659". The upper edge 151 of the upper virtual ledge can be near the roof surface 150 or positioned under a window of the building.

Figure 10B:
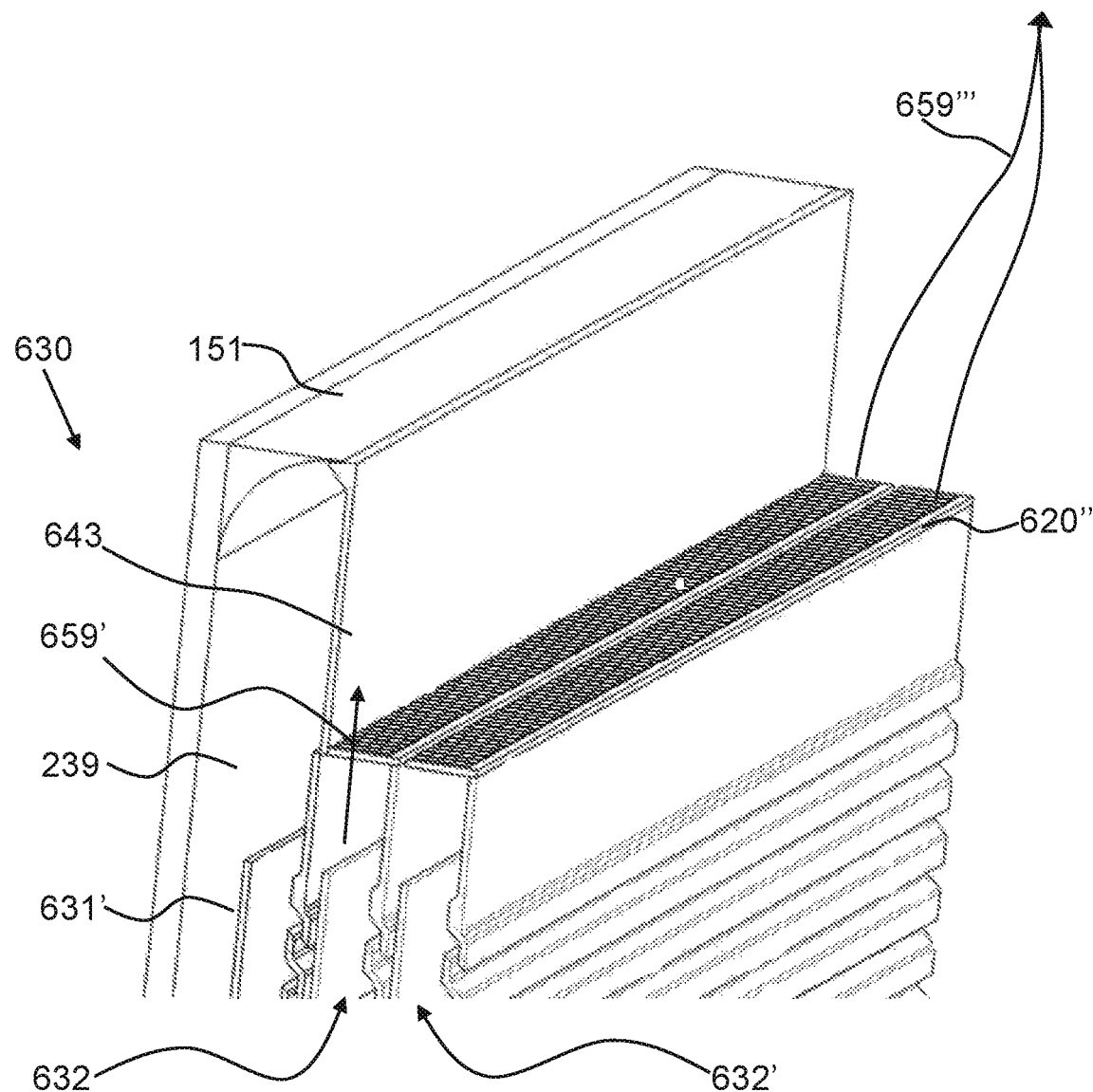
FIG. 10B shows the embodiment of FIG. 10A with the closing shutter wall in the closed position.

FIG. 10B shows the embodiment of FIG. 10A with the closing shutter wall 643 in the closed position. Then, only air flow coming through the upper grid elements 620" is combining into a roof protecting or window protecting air flow 659".

Of course, it is possible to provide only one front element 632 in front of the riser shaft 239 (not shown in the drawings) and also more than a first front element 632 and second front element 632' (as shown in FIG. 10B) forming the two outer lateral face element layers 630". Actually, when pushing the window protection element 530 in front of the lateral face element, two plus two (equal four) front elements can be formed as subsequent layers.

FIG. 11 shows a detailed partial perspective view of a window 132, accompanied by a left and right lateral face elements 430. The lateral face elements 430 are mounted in a sliding horizontal relationship on side wall 110 of the building. The lateral face elements 430 can be pushed laterally in front of the window 132. Below the window 132, a lateral face element similar to lateral face element 630 is positioned, wherein the upper virtual ledge 140' ends with an upper edge or surface 151, presenting the lower surface of window 132.

Figure 12:
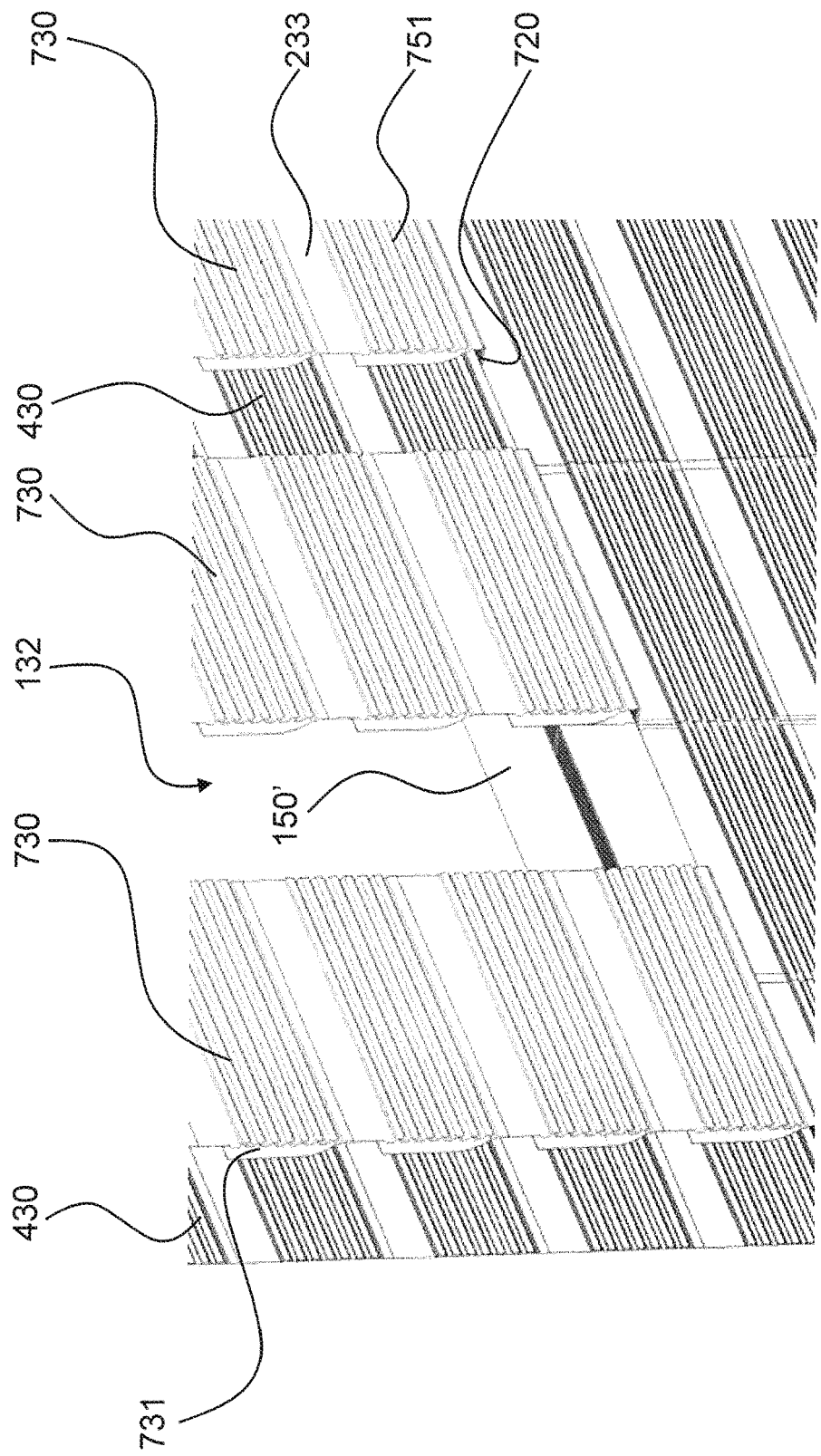
FIG. 12 shows a schematic perspective view of a partly closed window through use of lateral face elements without back wall according to a further embodiment.

FIG. 12 shows a schematic perspective view of partly closed (i.e. protected) windows 132 through use of lateral face elements 730 without a back wall according to a further embodiment. Here, there is only a front wall 233 with intermittent sequences 750 (cf. FIG. 13) of side air entries 751 in front of an intermediate side wall 731 (also denoted herein as riser shaft separation wall) attached at the front wall 233 between the side air entries 751 of successive sequences 750. Therefore, the airflow directed on the front wall 233 is re-oriented in the direction of the riser shaft 239 and mixed with the air of the lower sequences 750 of the side air entries 751 to enter at a higher stage into the lateral face element 430 of the building wall 110. The lateral face elements 730 without a back wall are supported at the bottom through a horizontal lower air entry (here grid) element 720 attached at the front wall 233, wherein the inner edge of the lower grid element 720 is near the front wall 233 of the lateral face element 430.

Figure 13:
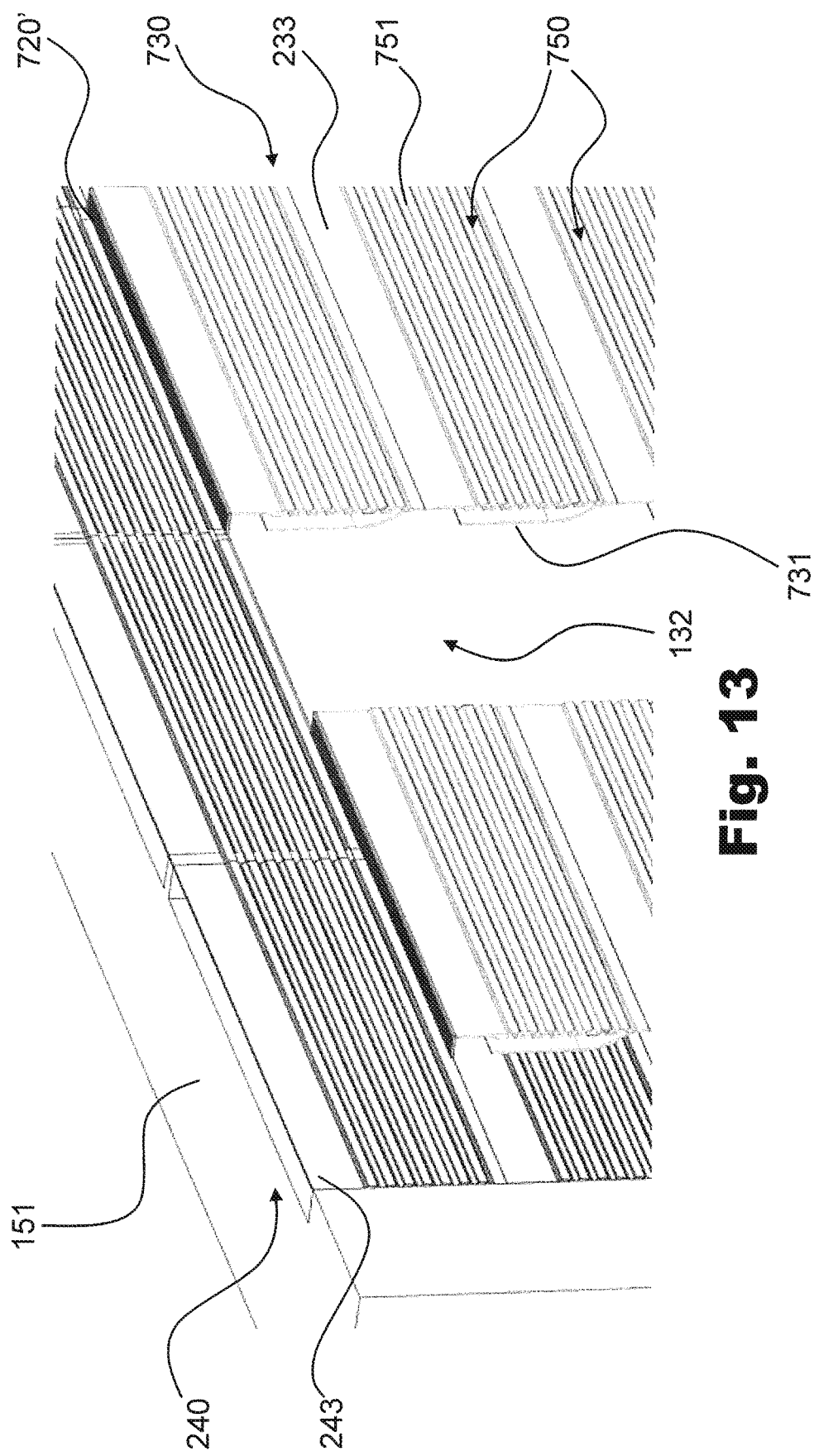
FIG. 13 shows a schematic perspective view of a detail of FIG. 12 relating to a top portion of the lateral face element.

FIG. 13 shows a schematic perspective view of a detail of FIG. 12 relating to a top portion of the lateral face element 730. The intermediate wall 731 is attached at the bottom of any sequence 750 of side air entries 751. The air flow rises between the outer surface of the window 132 and the intermediate wall 731 or in a mixing zone between two portions of subsequent intermediate walls 731 and leaves the intermediate space at an upper grid element 702' to mix eventually with air flowing out of the outlet opening of the upper virtual ledge 240. Here, the shutter wall 243 of the latter is closed.

Figure 14A:
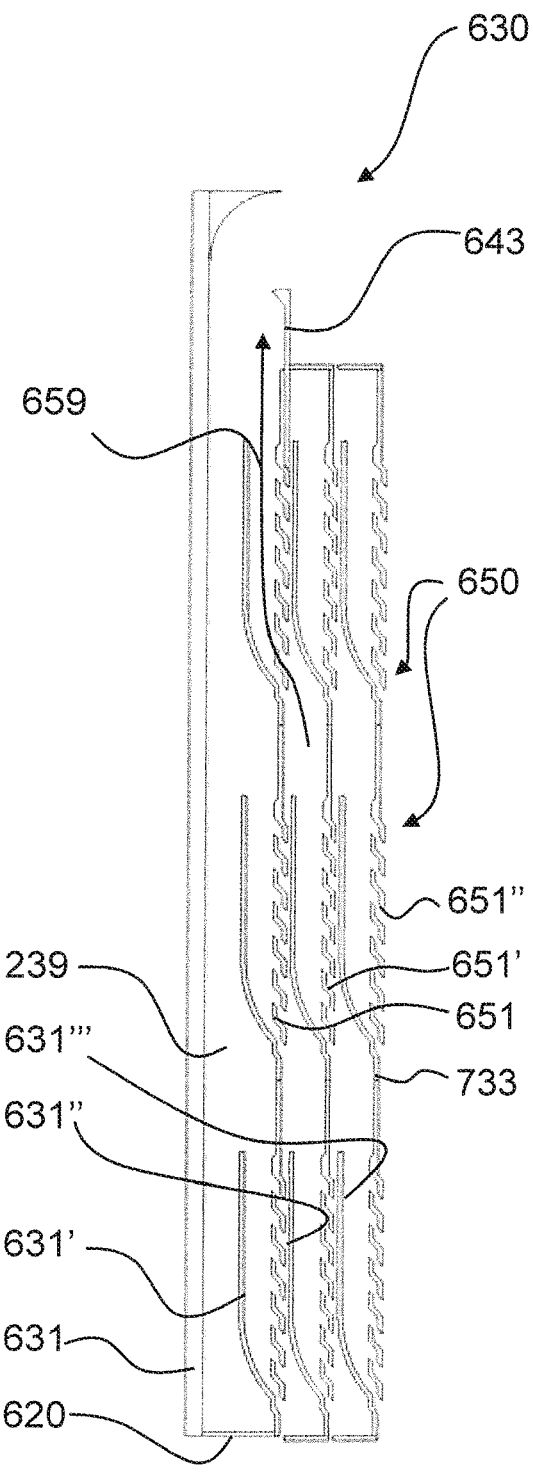
FIGS. 14A and 14B show detailed cross-sectional side views of the lateral face element of FIG. 9 in the open condition and in the closed condition, respectively.
Figure 14B:
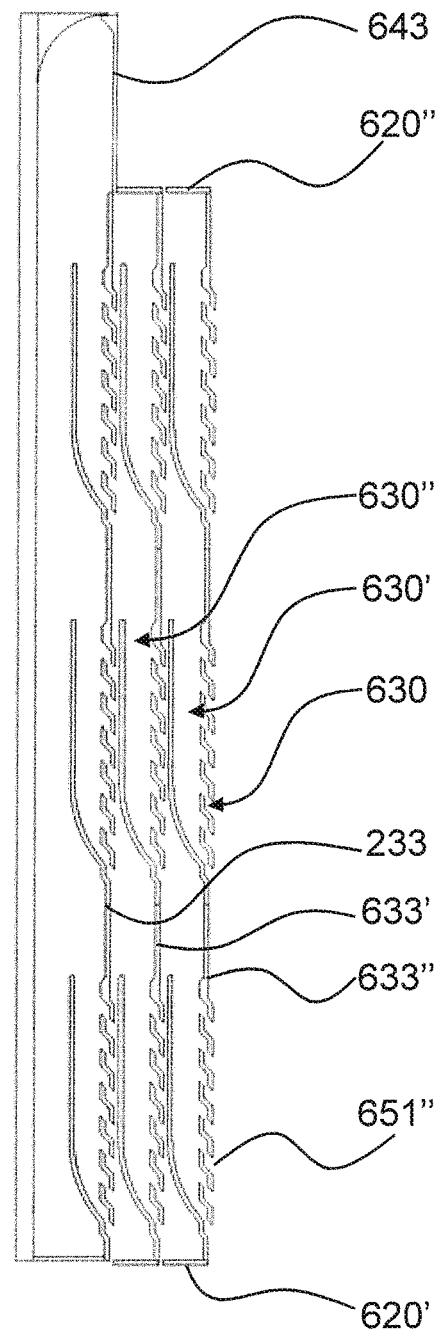

FIG. 14A shows a detailed cross-sectional side view of the lateral face element of FIG. 9 in the open condition of the closing shutter wall 643, wherein FIG. 14B shows the same element in a closed condition. Same reference numerals as in FIG. 9 are used here. It is clear that the number of layers of lateral face element 630, i.e. the number of its inner and outer layers 630' and 630", is not necessarily three, it can start from one to two to four and be even more than four. The above-described layers of lateral face element 630, i.e its inner layer 630' and the two outer layers 630" have front walls 233, 633' and 633", respectively, within which the side air entries 651, 651' and 651", respectively, are integrated in a vertical suite of three sequences 650 in each layer.

FIG. 15 shows a schematic perspective side view of part of a storey of a building 100 with four windows 132 and the back wall 231 (here formed by the building wall) of lateral face elements 130. FIG. 15 can be seen as a detail view of a portion of the building of FIGS. 1A-2. It does not show lateral face elements 130. The lateral face elements of the different embodiments described above usually comprise vertically oriented side walls but there are no further vertical ridges. In the embodiment of FIG. 15, a plurality of fins 160 and 165 are provided. Fins 160 are extending from the base element 120 up to the roof 150, or at least over several stories; whereas other fins 165 are only provided between storeys, i.e. in a vertical line between windows 132 of subsequent storeys. The aim of the fins 160 and 165 is to distribute heat from the building 100 into the air rising in the riser shaft 239 to be distributed eventually through the top grid elements 620" and upper virtual ledges 140 to the environment of the building 100. Furthermore, they ensure a laminar up flow in the different separated riser shafts 239.

FIG. 16 shows a schematic perspective view of a side wall 110 of a building 100 starting from a corner 101 including a plurality of windows 132, a plurality of lateral face elements 430 and sliding lateral face elements 730 adapted to completely cover the respective windows 132. The sliding lateral face elements 730 can be made of a transparent or translucent material. The lateral face elements 730 provide virtual curtains, e.g. as panels with dimensions such as e.g. 2 metres times 3 metres.

It is possible to provide in the direction of the above-mentioned lower or, respectively, upper grid elements 620, 620', 720, 720', etc. e.g. a plurality of horizontally oriented micro-fans having a vertically oriented axis of rotation. Such fans can be provided at different storeys. In such a way, it is possible to convert wind energy into electrical energy.

The webs 252 of the side air entries 251, 351, 451 of sequences 250, 350, 450 as well as the outer surface front wall 233 of lateral face elements can comprise photovoltaic elements which are connected at the lateral edges of the lateral face elements to use the surface for additional energy generation.

Figure 17:
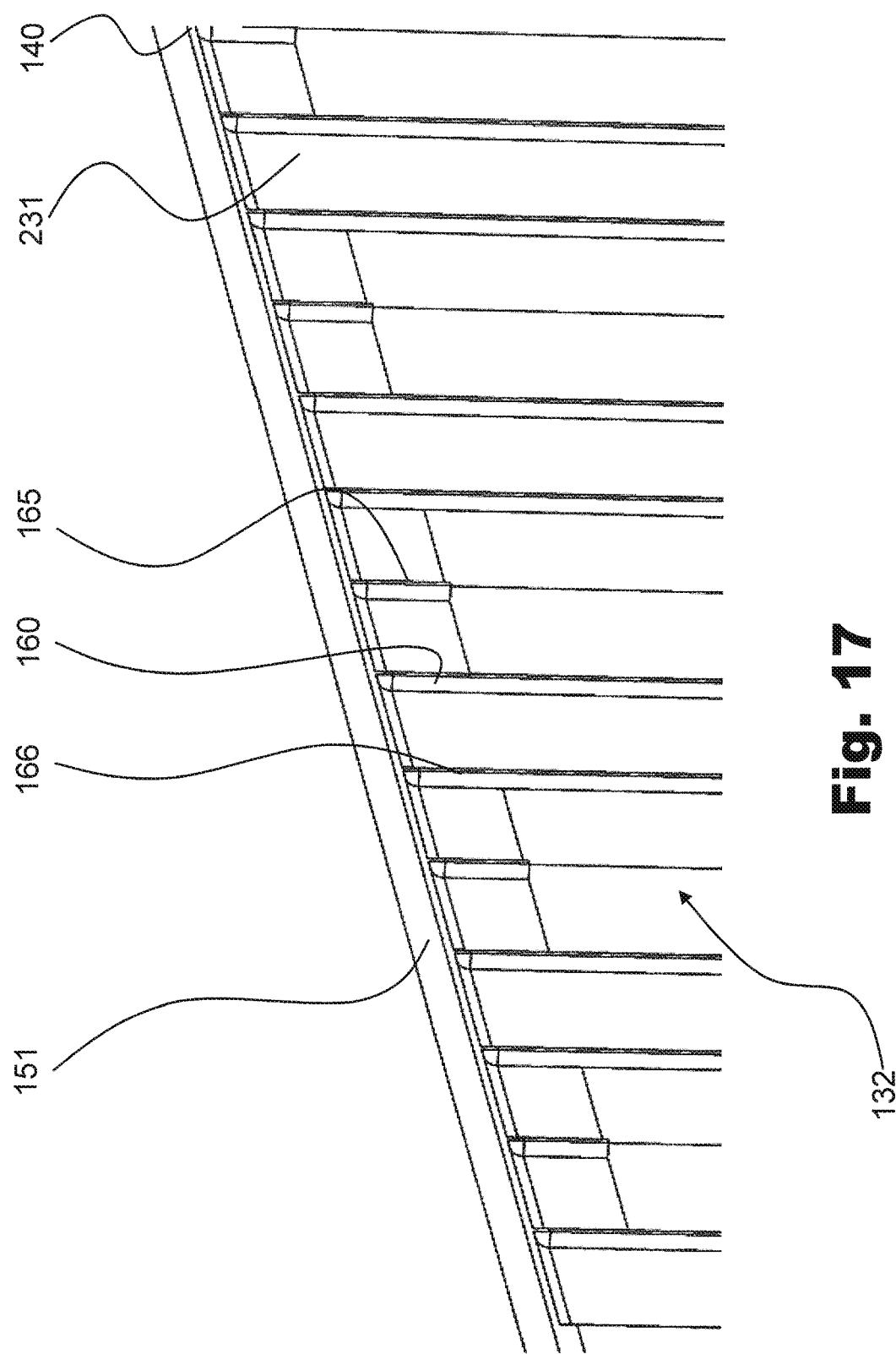
FIG. 17 shows a schematic perspective side view of an upper part of the building of FIG. 1 A/B near the roof.

FIG. 17 shows a schematic perspective side view of the upper part of the building of FIG. 1 A/B near the roof. Fins 160 as well as fins 165 have a front flat surface 166 adapted to be positioned against the back of the front wall 233 of the lateral face elements 130. The position of the fins can be used to delimit panels of lateral face elements 130 and/or the fins 160/165 can be integrated into the lateral face elements 130. In case of a cascade of first and second front elements 632, 632' or inner and outer layers 630' and 630" of a lateral face element (depending on the embodiment of the drawings), the fins 160 or 165 can be provided in the same way between the different stages or layers, i.e. integrated in between the respective delimiting front walls 233, 633' and 633".

Figures 18, 19:
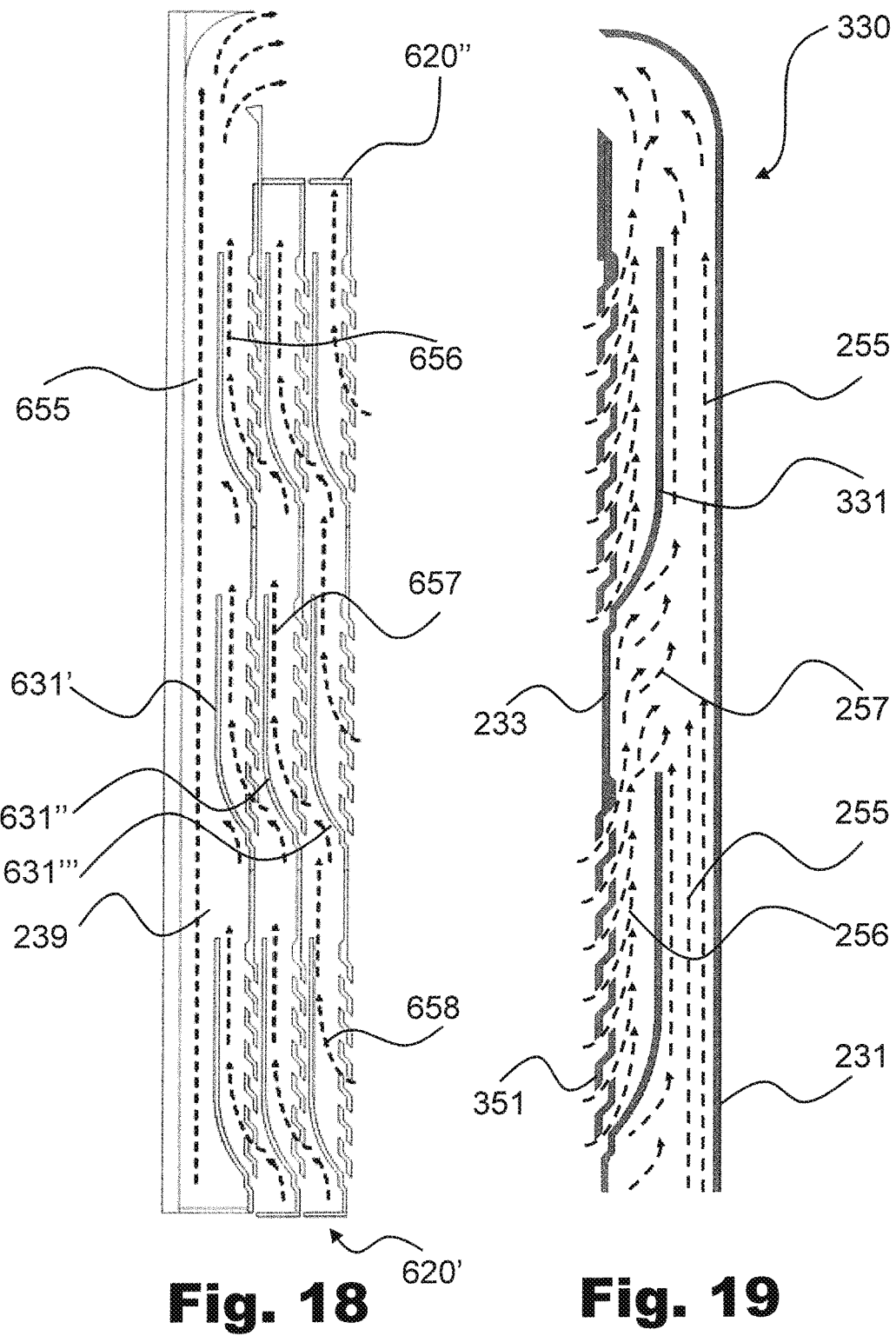
FIG. 18 shows an alternate side view of an embodiment similar to the embodiment shown in FIG. 9 with a representation of air flow inside the shafts.
FIG. 19 shows an alternate side view of the embodiment as shown in FIG. 7A with a representation of air flow inside the shaft.

FIG. 18 shows an alternate side view of an embodiment similar to the embodiment shown in FIG. 9 with a representation of air flows inside the shafts. Here, the intermediate walls 631', 631" and 631'" (also denoted herein as riser shaft separation walls) are positioned almost in contact or in contact at least partly, i.e. for a partial number, of underlying side air entries of the underlying sequence. Thus, even more air is directly forced into the underlying layer, i.e. from the second front element 632' or the second (or outer most) of the outer lateral face element layers 630" into the first front element 632 or outer lateral face element layer 630" and from there one sequence higher into the initial layer of the lateral face element 630 (cf. FIGS. 9-10B).

The air flowing in through the top side air entries 651" (cf. FIG. 9) creates the first level inside air flow 658, already mainly directed to rise, and any transverse movement is either dampened or not possible due to a fin 160 or 165. Then, this air flow 658 is entering the next stage or layer and is rising as second level inside air flow 657, possibly mixed with air flow of the same lateral face element stage/layer from below depending on the distance and flexibility of the intermediate wall 631'". Air flow 657 is then displaced even more from the outer wall elements of the building 100 when it enters the next stage of side air entries to create the inner air flow 656 in the reduced width riser shaft 239, where it is mixed at the upper end of the intermediate wall with the riser shaft air flow 655.

FIG. 19 shows an alternate side view of the embodiment as shown in FIG. 7A with a representation of air flow inside the shaft. Air entering into the lateral face element 330 is mixing in the inner air flow 256 with additional air from neighboring side air entries 351. Nevertheless, the air flow becomes quickly laminar. Beyond intermediate wall 331, the riser shaft air flow 255 is rising, especially in between side fins 160 and 165. Above the upper edge of the intermediate wall 331 and under the intermediate wall 331 of next sequence 330 there is a mixing zone, where the mixing zone air flow 257 is created with more turbulences but finally rising further in the more restricted width riser shaft 239 of the next stage to be mixed in an upper mixing zone before leaving the lateral face element 330 at the upper virtual ledge 140 or 240.

Figures 20A, 20B:
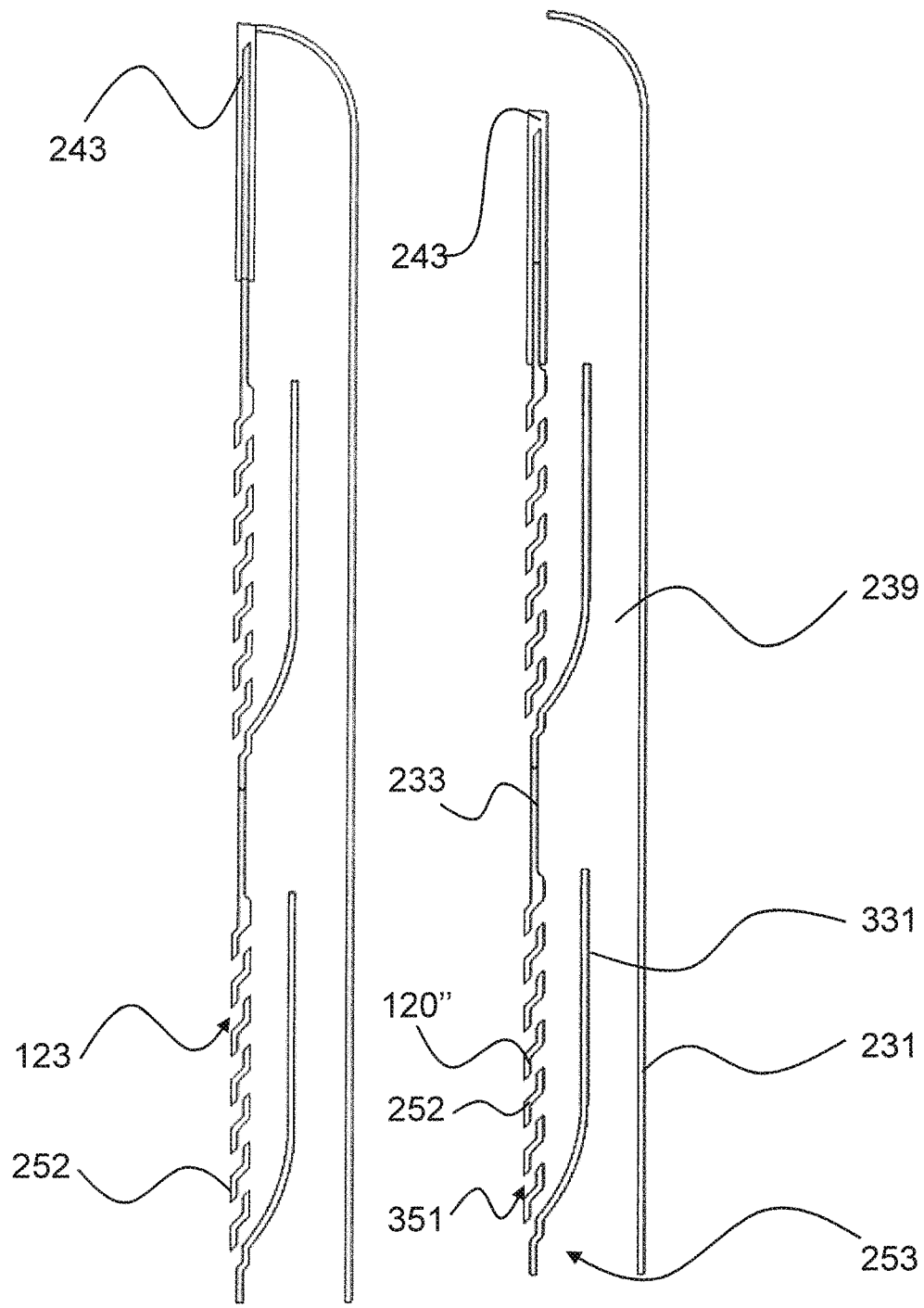
FIGS. 20A and 20B show schematic cross-sectional side views of a further embodiment of a lateral face element including an upper virtual ledge, similar to FIGS. 5A to 5C.

Finally, FIGS. 20A and 20B show schematic cross-sectional side views of a further embodiment of a lateral face element 330 including an upper virtual ledge 140/240 similar to FIGS. 5A to 5C. Here, the closing shutter wall 243 closes the rounded upper virtual ledge 240 just in front of its rounded virtual ledge wall 241. The side oriented grid 120" comprises a sequence of webs 252 in the outer wall 233, wherein the intermediate wall 331 is attached at the lowest web 253. The openings 123 are creating the sequence of side air entries 351.

LIST OF REFERENCE SIGNS

| | |
|---|---|
| 100 | building |
| 101 | corner |
| 110 | wall of the building |
| 120 | base element |
| 120' | intermediate base element |
| 120" | air inlet in lateral face element |
| 121 | frame |
| 122 | webs |
| 123 | opening |
| 124 | frame side surface |
| 130 | lateral face elements |
| 130' | lateral face element under a window |
| 131 | storey |
| 132 | window |
| 140 | upper virtual ledge |
| 140' | upper virtual ledge below a window |
| 150 | roof/roof surface/roof structure |
| 150' | window ledge/sill |
| 151 | upper edge |
| 160 | fin (long) |
| 165 | fin (small, over window) |
| 166 | front surface of fin |
| 230 | lateral face element |
| 231 | back wall, e.g. building wall |
| 232 | air flow |
| 233 | front wall |
| 239 | riser shaft |
| 240 | upper virtual ledge |
| 241 | rounded virtual ledge wall, or opening block |
| 243 | closing shutter wall, i.e. movable shutter |
| 244 | outer surface |
| 245 | upper edge |
| 246 | protrusion |
| 247 | upper sealing surface |
| 248 | lower portion |
| 249 | upper portion |
| 250 | sequence |
| 251 | side air entry |
| 252 | web |
| 253 | lowest web for attachment |
| 255 | riser shaft air flow |
| 256 | inner air flow |
| 257 | mixing zone air flow |
| 330 | lateral face element |
| 331 | intermediate wall, i.e. riser shaft separation wall |
| 332 | back riser shaft cavity/ reduced diameter portion |
| 334 | front riser shaft cavity |
| 335 | portion in the riser shaft between two subsequent sequences of side air entries |
| 350 | sequence |
| 351 | side air entry |
| 430 | lateral face element |
| 440 | upper virtual ledge |
| 443 | closing shutter wall |
| 450 | sequence |
| 451 | side air entry |
| 520 | lower grid element as lower air entry element |
| 520' | upper grid element |

-continued

| | |
|---|---|
| 530 | window protection element/ sliding lateral face element |
| 536 | double arrow |
| 550 | sequence |
| 620 | lower grid element as lower air entry element |
| 620' | lower grid element as lower air entry element |
| 620" | upper grid element |
| 630 | lateral face element |
| 630' | inner lateral face element layer |
| 630" | outer lateral face element layer |
| 631 | back wall |
| 631' | intermediate wall, i.e. riser shaft separation wall |
| 631" | intermediate wall, i.e. riser shaft separation wall |
| 631' | intermediate wall, i.e. riser shaft separation wall |
| 632 | first front element |
| 632' | second front element |
| 633' | front wall of first front element |
| 633" | front wall of second front element |
| 643 | closing shutter wall |
| 650 | sequence |
| 651 | side air entry |
| 651' | middle side air entry |
| 651" | top-layer side air entry |
| 655 | riser shaft air flow |
| 656 | inner air flow |
| 657 | second level inside air flow |
| 658 | first level inside air flow |
| 659 | arrow of inside directed air flow |
| 659' | arrow of front element air flow |
| 659" | air flow with open shutter wall |
| 659'" | air flow with closed shutter wall |
| 720 | lower grid element |
| 720' | upper grid element |
| 730 | (e.g. sliding) lateral face element without back wall |
| 731 | intermediate wall, i.e. riser shaft separation wall |
| 751 | side air entry |

The invention claimed is:

1. A wind protection device for a building (100), having a lateral face element (130, 230, 330, 430, 530, 630, 730) positioned at a distance from an inner building wall (231) creating at least one riser shaft (239) for air, the lateral face element (130, 230, 330, 430, 530, 630, 730) being closed at lateral sides (160, 165, 101),
wherein the wind protection device further comprises at least one lower air entry element (120, 520, 620, 620') connected to at least one riser shaft (239) and at least one upper virtual ledge (140, 140', 240, 440; 620") connected to at least one riser shaft (239) comprising an outlet opening directing the air flow from the connected riser shaft(s) (239) to the area in front and above the respective upper virtual ledge (140, 140', 240, 440; 620"), and wherein the lateral face element (130, 230, 330, 430, 530, 630, 730) comprises at least one sequence (250, 350, 550, 650, 750) of side air entries (251, 351, 651, 651', 651", 751) connected with at least one riser shaft (239), characterized in that
behind each sequence (250, 350, 650) of side air entries (251, 351, 651, 651', 651", 751) a riser shaft separation wall (331, 631', 631", 631'", 731) is provided being attached below said sequence (250, 350, 550, 650, 750) and having a free end at the uppermost air entry (251, 351, 651, 651', 651", 751) of the respective sequence (250, 350, 550, 650, 750).

2. The wind protection device for a building (100) according to claim 1, wherein a plurality of sequences (250, 350, 650) of side air entries (251, 351, 651, 651") is provided at each storey of the building (100).

3. The wind protection device for a building (100) according to claim 1, wherein a plurality of sequences (650) of side air entries (651", 651', 651) are provided one mounted on the other in the direction perpendicular to the plane of a front wall (233) of the lateral face elements (230, 330, 430, 530, 630, 730) allowing for an airflow (659, 659') directed to an inner or innermost riser shaft (239).

4. The wind protection device for a building (100) according to claim 1, wherein the lower air entry element (120, 520, 620, 620') comprises at least one base element from the group encompassing a vertically oriented grid (120) creating a cavity behind it in front of the building wall (231) or a horizontally oriented grid (520, 620, 620') positioned under a portion of one of the riser shafts (239).

5. The wind protection device for a building (100) according to claim 1, wherein the upper virtual ledge (140, 140', 240, 440; 620") comprises at least one outlet from the group encompassing an opening block (241) having a curved surface starting, in a cross section view, from a vertical orientation of its lower portion (248) parallel to the building wall (231) and going over to an orientation of its upper portion (249) oriented to the exterior of the building, or an opening (620") oriented perpendicular to the air flow in the associated riser shaft (239).

6. The wind protection device for a building (100) according to claim 5, wherein the at least one outlet comprises a movable shutter (243) adapted to fully or partially close the outlet.

7. The wind protection device for a building (100) according to claim 1, wherein upper virtual ledges (140, 140', 240, 440; 620") are provided at several different height positions at the building from the following group: under the roof (150), under a window (132), or at predetermined horizontal storey lines.

8. The wind protection device for a building (100) according to claim 1, wherein the riser shafts (239) are separated by fins (160, 165) connected to the building wall (231) and window (132) areas, creating a more laminar vertical air flow between the parallel fins (160, 165), wherein optionally the fins (160, 165) are made of heat conductive material providing a heat exchange between the air in the riser shafts (239) and the building (100) structure.

9. The wind protection device for a building (100) according to claim 1, wherein at least one lateral face element is a sliding (536) lateral face element (530, 730) positioned in front of a window (132), wherein the sliding lateral face element (530, 730) comprises at least one sequence (250, 350, 550, 650) of side air entries (251, 351, 651, 651", 751) connected with a cavity behind the sliding lateral face element (530, 730).

10. The wind protection device for a building (100) according to claim 9, wherein the sliding lateral face element (530, 730) further comprises a lower horizontal air entry (520) and/or a back wall (231).

11. The wind protection device for a building (100) according to claim 9, wherein the sliding lateral face element (530, 730) also further comprises an intermediate separation wall (331) for every sequence (250, 350, 550, 650) of side air entries (251, 351, 651, 651", 751), wherein these side air entries (251, 351, 651, 651", 751) are positioned at the same height as in lateral face elements (430) positioned sideways of the window (132).

12. The wind protection device for a building (100) according to claim 1, wherein a sequence of vertically oriented micro-turbines are arranged one beside the other along one or more different heights in the riser shaft (239).

\* \* \* \* \*